US009467431B2

(12) United States Patent
Walker et al.

(10) Patent No.: US 9,467,431 B2
(45) Date of Patent: Oct. 11, 2016

(54) APPLICATION SPECIFIC MASTER KEY SELECTION IN EVOLVED NETWORKS

(75) Inventors: John Michael Walker, The Hague (NL); Susana Fernandez Alonso, Madrid (ES); Mats Näslund, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 426 days.

(21) Appl. No.: 12/867,687

(22) PCT Filed: Feb. 15, 2008

(86) PCT No.: PCT/SE2008/050178
§ 371 (c)(1),
(2), (4) Date: Aug. 13, 2010

(87) PCT Pub. No.: WO2009/102247
PCT Pub. Date: Aug. 20, 2009

(65) Prior Publication Data
US 2011/0004758 A1    Jan. 6, 2011

(51) Int. Cl.
*H04L 9/32* (2006.01)
*H04L 29/06* (2006.01)
*H04L 12/06* (2006.01)

(52) U.S. Cl.
CPC .............. *H04L 63/062* (2013.01); *H04L 12/06* (2013.01); *H04L 63/083* (2013.01)

(58) Field of Classification Search
CPC ...... H04L 63/062; H04L 63/065; H04L 9/00; H04L 9/08; H04L 9/0891
See application file for complete search history.

(56) References Cited

U.S. PATENT DOCUMENTS 5,408,448 A * 4/1995 Carman ................... 369/178.01
6,393,127 B2 * 5/2002 Vogler .......................... 380/283
(Continued)

FOREIGN PATENT DOCUMENTS

EP    1773018 A1    4/2007

OTHER PUBLICATIONS

Salowey, J. et al. "EAP Key Derivation for Multiple Applications." Network Working Group, Internet-Draft, Document: draft-salowey-eap-key-deriv-01.txt, Jun. 2003.
(Continued)

*Primary Examiner* — Arvin Eskandarnia
(74) *Attorney, Agent, or Firm* — Coats & Bennett, PLLC

(57) ABSTRACT

An authentication method comprises providing a set of N plural number of master keys both to a user terminal (13) and to home network entity (11) and, when performing an authentication key agreement (AKA) transaction for an application, selecting one of the N number of master keys to serve as a master key for use both at the user terminal and the home network entity for deriving further keys for the application. For example, when performing an authentication key agreement (AKA) transaction for a first application, the method involves randomly selecting one of the N number of master keys to serve as a first master key for use both at the user terminal and the home network entity for deriving further keys for the first application; but when performing an authentication key agreement (AKA) transaction for another application, the method involves randomly selecting another one of the N number of master keys to serve as master key for use both at the user terminal and the home network entity for deriving further keys for the another application.

36 Claims, 14 Drawing Sheets

(56) References Cited

U.S. PATENT DOCUMENTS

| | | | |
|---|---|---|---|
| 6,944,770 B2* | 9/2005 | Henderson | G06Q 20/02 |
| | | | 713/189 |
| 7,386,573 B2* | 6/2008 | Davis | 369/30.06 |
| 7,519,184 B2* | 4/2009 | Kayashima | H04L 9/0891 |
| | | | 380/201 |
| 7,765,178 B1* | 7/2010 | Roizen et al. | |
| 2005/0135622 A1* | 6/2005 | Fors | H04L 63/06 |
| | | | 380/268 |
| 2007/0101122 A1* | 5/2007 | Guo | 713/153 |
| 2007/0280481 A1 | 12/2007 | Eastlake et al. | |

OTHER PUBLICATIONS

Slijepcevic, S. et al. "On Communication Security in Wireless Ad-Hoc Sensor Networks." Proceedings of the 11th IEEE International Workshops on Enabling Technologies: Infrastructure for Collaborative Enterprises, Jun. 10-12, 2002.

* cited by examiner

APPLICATION SPECIFIC MASTER KEY SELECTION IN EVOLVED NETWORKS

BACKGROUND

I. Technical Field

This invention pertains to authentication and security of information transmitted over a network, such as a telecommunications network, for example.

II. Related Art and Other Considerations

Many networks have a procedure for authenticating a user terminal to the network and vice versa. Typically the authentication procedure involves use of a pre-shared secret key stored both at a predetermined location (such as an Authentication Centre (AuC)) and at the user terminal. Other parameters utilized in the authentication procedure are generally derived from this key.

Usage of a key for authentication involves key management activities. Key management for some networks is generally based on well-known mechanisms such as the Authentication and Key Agreement (AKA) mechanisms. During an AKA procedure, messages with parameters to be confirmed by the user terminal are obtained/delivered from an Authentication Center (AuC). Such parameters are joined together in an Authentication Vector (AV). Parts of this Authentication Vector (AV) are delivered through the network to the user terminal. The user terminal must then perform some calculations to match this challenge. The result of the user terminal calculation is sent back and checked against the Authentication Vector (AV). If the results match, then the authentication is successful. If the result fails some other procedures are activated to correct the problem.

Authentication such as that described above can be utilized in many types of networks, such as telecommunications networks, for example. In a typical cellular radio system, wireless user terminals (also known as mobile stations, mobile terminals, and mobile user equipment units (UEs)) communicate via a radio access network (RAN) to one or more core networks. The user terminals can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by a unique identity within the local radio area, which is broadcast in the cell. The base stations communicate over the air interface (e.g., radio frequencies) with the user terminals within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. The UMTS Terrestrial Radio Access Network (UTRAN) is essentially a radio access network providing wideband code division multiple access for user equipment units (UEs). The Third Generation Partnership Project (3GPP) has undertaken to evolve further the UTRAN and GSM based radio access network technologies.

Key management for 2GPP/3GPP networks as well as IP Multimedia Subsystem [IMS] networks are generally based on well-known UMTS or GSM mechanisms such as the aforementioned Authentication and Key Agreement (AKA) mechanisms. See, for example, 3rd Generation Partnership Project, "3GPP Technical Specification 3GPP TS 33.102 V5.1.0: "Technical Specification Group Services and System Aspects; 3G Security; Security Architecture (Release 5)"", December 2002. Even the key management of the Internet Engineering Task Force/Extensible Authentication Protocol [IETF/EAP] uses essentially a variant of the AKA (having a "shimlayer" on top of the basic AKA), and thus for EAP the security properties are basically the same.

During an AKA procedure for a telecommunications network involving a radio access network (RAN), messages with parameters to be confirmed by the user terminal are obtained/delivered from an Authentication Center (AuC). Such parameters are joined together in an Authentication Vector (AV). The Authentication Vector (AV) is delivered to the core network, which distributes parts of this Authentication Vector (AV) through the radio access network to the user terminal. As indicated previously, the user terminal must then perform some calculations to match this challenge. The result of the user terminal calculation is sent back and checked against the Authentication Vector (AV) where it originated. If the results match, then the authentication is successful. If the result fails some other procedures are activated to correct the problem.

The AKA type mechanisms have not evolved very much over the last years. In the current evolution of telecommunication networks towards an all-IP network that consider convergence of fixed-mobile networks as well as convergence (or at least-integration) of 3GPP access networks (GERAN/UTRAN/LTE) with non-3GPP access networks which are more IEEE/IETF-based (Wimax/I-WLAN/xDSL), the number of security risks may increase. But a requirement in this evolution is compatibility with existing networks and mechanisms. This implies that these networks (and thus terminals) shall be able to also make use of AKA procedures. As noted, non-3GPP accesses may already use AKA over the IETF EAP framework (EAP-AKA).

3GPP is currently specifying standards for the "next generation" networks, the Evolved Packet System (EPS) with an Evolved UTRAN (EUTRAN) radio access. This is a simplified network architecture which needs to enjoy at least the same level of security as the more complex GERAN/UTRAN architectures.

In addition to making use of AKA in the access layers as described in the previous paragraph, it is also possible to use AKA in the application or service domain such as Digest AKA (also known as IP Multimedia Subsystem [IMS] AKA) is used in the IMS domain or GBA in the application domain in general.

The UICC (Universal Integrated Circuit Card) is a chip card (e.g., smart card) used in mobile user terminals in GSM and UMTS/EPS networks and involves, e.g., in authentication. In a GSM network, the UICC contains a SIM application and in a UMTS/EPS network it is the USIM application. A UICC may contain several applications, making it possible for the same smartcard to give access to both GSM and UMTS networks. A given UICC (Universal Integrated Circuit Card) [UICC] has two options: (1) using different "Ki" keys/credentials for USIM and ISIM applications; and (2) sharing the same Ki for both USIM and ISIM. However, in this case the security algorithms (key derivation functions) must be different for USIM and ISIM.

Unfortunately, prior art methods are generally inflexible in what basic "credential" that is allowed. While the EAP framework adds some flexibility by defining so-called "EAP methods", there is no flexibility (with full security) when switching between different methods for a given client. There are also security problems when re-using the same credential/key for different purposes.

Some methods (typically smart card deployments in "military" scenarios) allow storing larger number of keys on the same "smart card", but each key is typically tied to a specific purpose/application. This means that an attacker can "amortize" his cryptanalytic effort since he knows that each time application "X" is run, it will be using the same base key again and again.

In cryptography, a public key infrastructure (PKI) is an arrangement that binds public keys with respective user identities by means of a certificate authority (CA). For each user, the user identity, the public key, their binding, validity conditions and other attributes are made unforgeable in public key certificates issued by the certificate authority (CA).

A typical threat for PKI keys is to re-use the same key for both signatures and authentication (the terminal may "think" it is responding to an authentication challenge, but in reality it is signing/committing to a "document" or "agreement"). Normally, separate, designated keys are used for signatures and authentication to mitigate this (the certificate specifies the "allowed purpose" of the key).

What are needed, therefore, are further ways to increase security related to the actual keys that are used by AKA, and thus further strengthen AKA as a valid mechanism. This is particularly necessary when convergence of networks (and as convergence of different technologies) is the common denominator.

BRIEF SUMMARY

In one of its aspects, the technology concerns an authentication method which comprises providing a set of N plural number of master keys both to a user terminal and to a home network entity and, when performing an authentication key agreement (AKA) transaction for an application, randomly selecting one of the N number of master keys to serve as a master key for use both at the user terminal and the home network entity for deriving further keys for the application. For example, when performing an authentication key agreement (AKA) transaction for a first application, the method involves randomly selecting one of the N number of master keys to serve as a first master key for use both at the user terminal and the home network entity for deriving further keys for the first application; but when performing an authentication key agreement (AKA) transaction for another application, the method involves selecting another one of the N number of master keys to serve as master key for use both at the user terminal and the home network entity for deriving further keys for the another application.

In an example embodiment, randomly selecting one of the N number of master keys to serve as a first master key comprises selecting key y of the set, where y=(RAND mod N), where RAND is a random number known to both the user terminal and the home network entity for the user terminal and where the keys are arranged according to some determined order.

The selection of another one of the N number of master keys to serve as master key for the other applications can be accomplished according to various example embodiments. As a first example embodiment, selecting another one of the N number of master keys to serve as master key for the another application comprises using a next of the master keys in a predetermined order, such as cyclical order, for example. As another example embodiment, selecting another one of the N number of master keys to serve as master key for the other application comprises selecting key y' of the set, where y'=(RAND' mod N), where RAND' is a random number known to both the user terminal and the home network entity for the user terminal, but wherein y' does not correspond to the first master key and wherein RAND' is not used to obtain the first master key. As yet another example embodiment, selecting another one of the N number of master keys to serve as master key for the other application comprises selecting key y' of a revised set, the revised set comprising N−1 number of master keys, the revised set of master keys not including the first master key selected for the first application, and wherein where y'= (RAND' mod N−1), where RAND' is a random number known to both the user terminal and the home network entity for the user terminal. Preferably RAND' is not used to obtain the first master key. Thus, whereas in most cases selection of the first master key is random, selection of the next key for another application is not independently random in the sense that the first key may be tagged as used and thus the second key selection, while being perhaps random among the remaining set, is not random over the entire set of keys. In an extreme situation, only one key may remain as a candidate for the next application. In other situations, selection may be made partly in dependence upon other information such as user state, e.g., location, which is not a random factor.

In another example embodiment, randomly selecting one of the N number of master keys to serve as a first master key comprises plural factors, the plural factors comprising (1) a random number known to both the user terminal and the home network entity for the user terminal; and (2) a second factor. In differing implementations, the second factor can be one or more of: (1) user terminal type/identity; (2) access network type; (3) user terminal location; (4) context information for the first application.

In yet another example embodiment, the method comprises using a distinct first set of algorithms to derive the further keys for the first application, and then using a distinct second set of algorithms to derive the further keys for the second application.

In still another example embodiment, the method comprises selecting a new first master key for the first application upon expiration of the first master key. In an example implementation, the method comprises selecting the new first master key upon expiration of duration for the first master key; expressing the duration as a sequence value after which authentication vector(s) are no longer valid; and, upon reaching the sequence value, performing a new authentication procedure to select the new first master key for the first application.

In yet still another example embodiment, the method comprises selecting the new first master key at least in part on basis of user state information. In example implementations, the user state information comprises at least one of: (1) a timestamp; (2) a network identifier; and (3) a user location.

In a further still another example embodiment, wherein when a suspect one of the master keys should not be used, the method comprises: randomly generating a replacement master key; encrypting the replacement master key with a superkey known to the user terminal and the home network entity; sending the encrypted replacement master key from the home network entity to the user terminal; and, at the user terminal, replacing the suspect one of the master keys with the replacement master key.

In an example implementation, the network is a telecommunications network and the user terminal is a wireless user terminal. In such implementation the method further comprises providing selected authentication vector values to the wireless user terminal through a radio access network, and the wireless user terminal using the selected authentication vector values to obtain the first master key and further keys for use by the first application.

In another of its aspects, the technology concerns an entity for operational use in an authentication system. The entity comprises a master key memory; an application-specific master key selector; and a further key generator configured to use a master key selected by the application-specific master key to derive the further keys. The master key memory is configured to store a set of N plural number of master keys for a user terminal. The application-specific master key selector is configured to randomly select, for a first application performed by the user terminal, a first one of the N number of master keys to serve as a master key for use both by the user terminal and a home network entity for deriving further keys for the first application, and to select for another application performed by the user terminal, another one of the N number of master keys to serve as a master key for use both by the user terminal and the home network entity for deriving further keys for the another application.

In an example embodiment, the entity is an authentication server situated in a home environment of the telecommunications system. In another example embodiment, the entity is a wireless user terminal comprising a transceiver configured to receive at least some contents of an authentication vector from an authentication server of the telecommunications system.

In an example implementation, the network is a telecommunications network and the user terminal is a wireless user terminal which communicates with the home network entity at least partially through a radio access network.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1A:
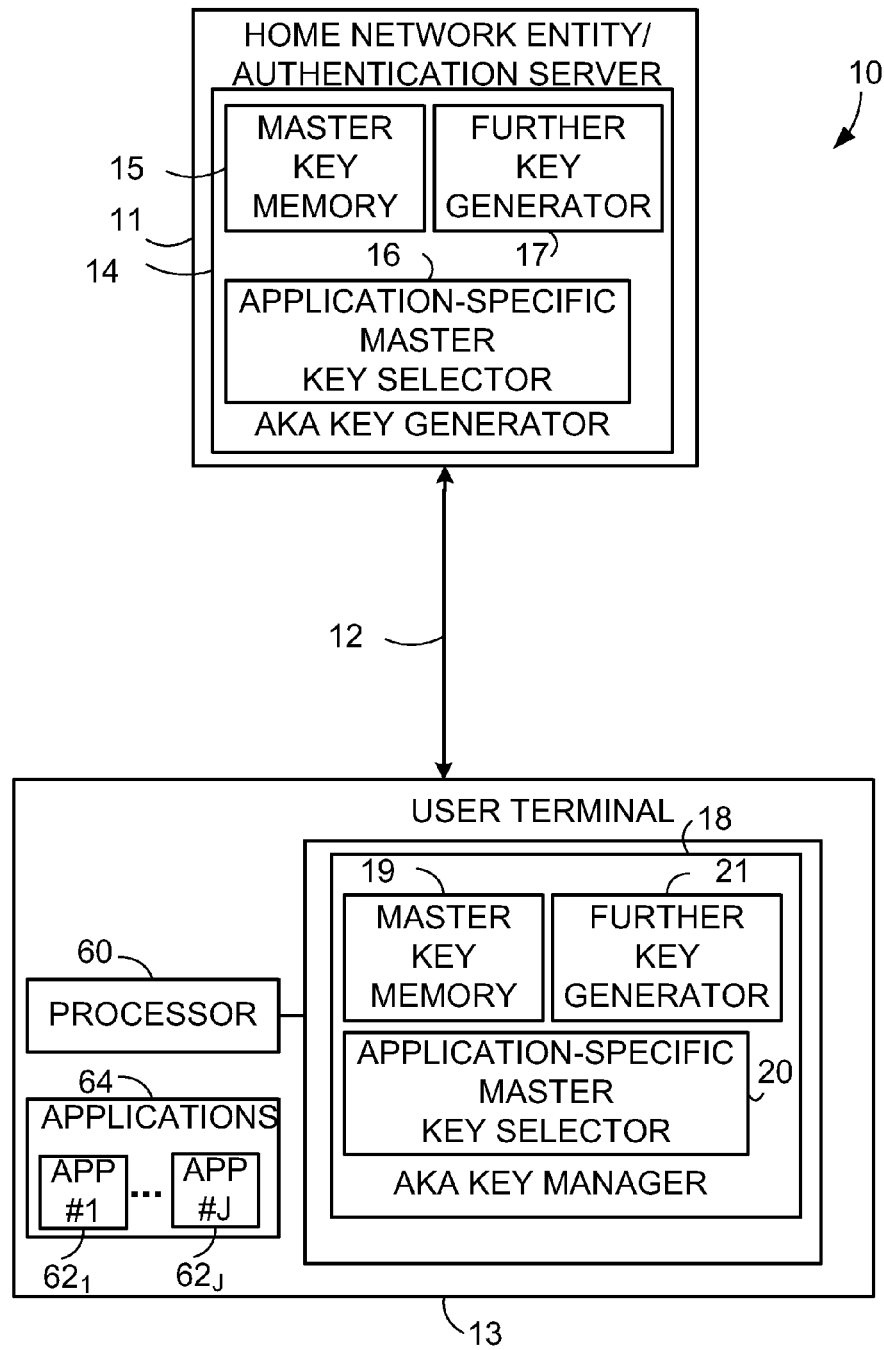
FIG. 1A is a diagrammatic view of an example network which includes both an AKA key generator in a home network entity/authentication server (AuC) and an AKA key manager for a user terminal according to an example illustrative embodiment.

FIG. 1A illustrates generic network 10 which hosts an authentication operation. Network 10 comprises home network entity/authentication server (AuC) 11 which communicates over link 12 with plural user terminals, one such user terminal 13 being illustrated in FIG. 1A. The home network entity/authentication server (AuC) 11 provides authentication functionality for plural user terminals which share the same or similar home environment. The home network entity/authentication server (AuC) 11 holds all the data needed for authentication, ciphering and integrity for each user.

Home network entity/authentication server (AuC) 11 comprises, among others of its unillustrated constituent functionalities, AKA key generator 14(40). As illustrated in FIG. 1A, AKA key generator 14 comprises AuC master key memory 15; AuC application-specific master key selector 16; and AuC further key generator 17. As hereinafter explained and illustrated in more detail for differing embodiments and implementations, AuC master key memory 15 stores a set of N plural number of master keys for a user terminal such as user terminal 13. For each application executed by user terminal 13 the AuC application-specific master key selector 16 randomly selects a differing (e.g., statistically unique) one of the N number of master keys to serve as a master key. The AuC further key generator 17 then uses the selected master key for the application to derive further keys for use with that application, e.g. data protection keys. In other words, for a first application performed by user terminal 13, a first one of the N number of master keys is selected by AuC application-specific master key selector 16 to serve as a master key for use both by the user terminal 13 and home network entity 34 for deriving further keys for the first application, but for another application performed by user terminal 13, the AuC application-specific master key generator 16 selects (e.g., pseudo-randomly) another one (e.g. distinct) of the N number of master keys to serve as a master key for use both by the user terminal and the home network entity for deriving further keys for the another application.

In similar manner, user terminal 13 comprises AKA key manager 18. For the user terminal 13, AKA key manager 18 likewise comprises similar functionalities such as terminal master key memory 19; terminal application-specific master key selector 20; and terminal further key generator 21.

Figure 1B:
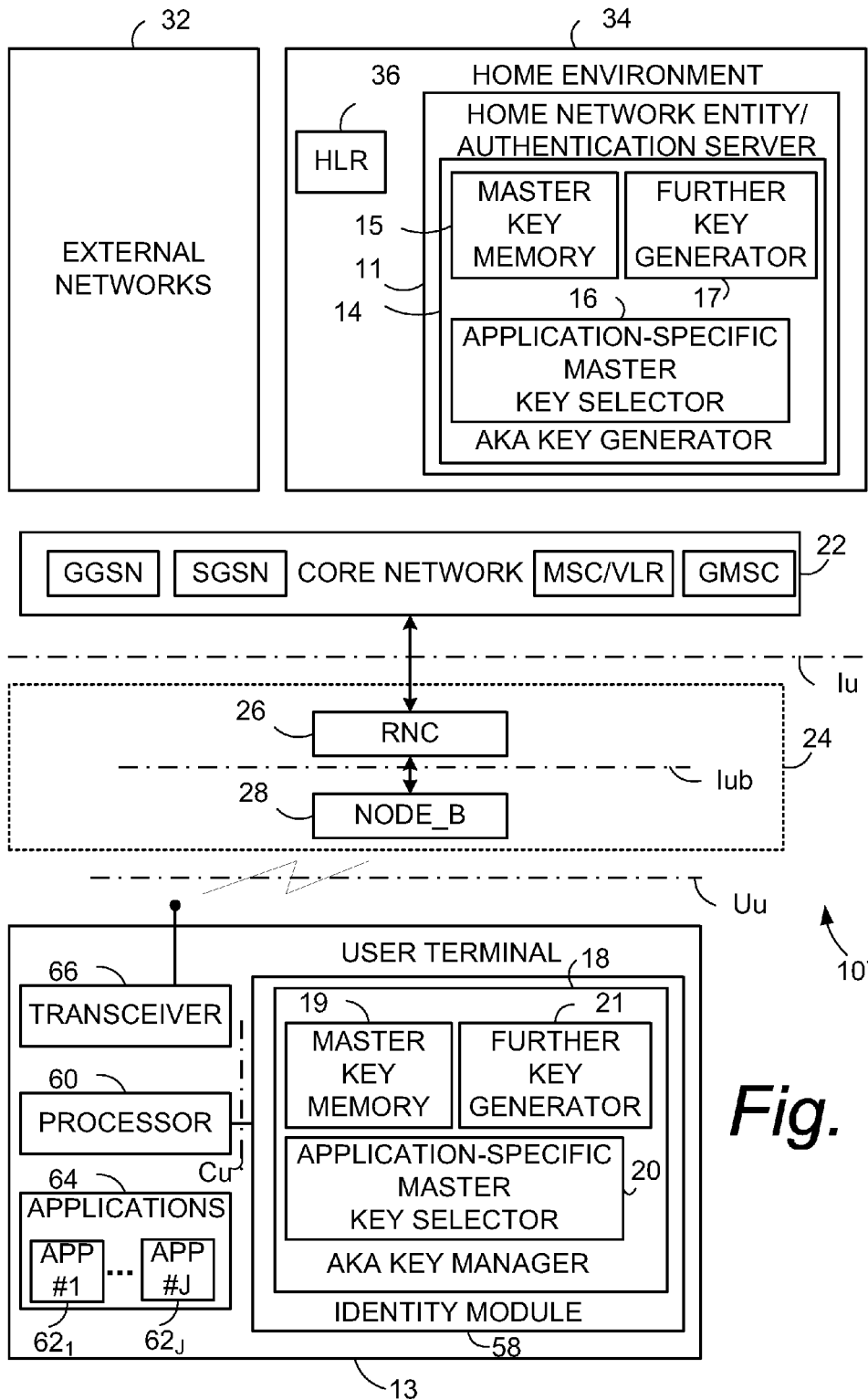
FIG. 1B is a diagrammatic view of an example telecommunications network which implements features of the embodiment of FIG. 1A.

Since network 10 is illustrated generically in FIG. 1A, link 12 can take many different forms. For example, link 12 can include one or more of a hardwire link, a radio frequency link, or an optical link, among others. The nature of link 12 depends upon the type(s) of network(s) which is/are intermediate home network entity/authentication server (AuC) 11 and user terminal 13. As just one, non-limiting, example implementation, FIG. 1B illustrates an example telecommunications network 10T wherein core network 22 is connected over an Iu interface to radio access network 24. Although not illustrated as such in FIG. 1B, it will be appreciate that core network 22 can comprise both a circuit switched (CS) domain and a packet switched (PS) domain, as well as operator('s)(s') backbone networks. The PS domain offers data services for the user by connections to the Internet and other data networks, and the CS domain offers 'standard' telephone services to other telephone networks. The nodes in the CN are interconnected by the operator's backbone, typically linked by high-speed network technologies like ATM.

In core network 22, the packet switched (PS) domain can comprise a Serving GPRS Support Node (SGSN) node and a Gateway GPRS Support Node (GGSN) node. The Serving GPRS Support Node (SGSN) is connected to radio access network 24 (e.g., UTRAN) by the Iu PS interface and to the GGSN by the Gn interface. The SGSN is responsible for all packet switched connections for the subscriber. It holds subscriber data (e.g., International Mobile Subscriber Identity (IMSI); Temporary identities (P-TMSI addresses); Packet Data Protocol (PDP) addresses), subscription information and location information (e.g., Routing area of the subscriber; VLR number; GGSN addresses of every GGSN that have active connections).

The Gateway GPRS Support Node (GGSN) is interconnected to other data networks. All data communications go through a GGSN between the subscriber and external networks. As with the SGSN it holds both two types of data, subscriber information (e.g., International Mobile Subscriber Identity (IMSI); Packet Data Protocol (PDP) addresses) and location information (e.g., the address of the current SGSN that the subscriber is connected to). The GGSN is connected by the Gi interface to the Internet and by the Gp interface to the Border Gateway.

In core network 22, the circuit switched (CS) domain can comprise a mobile switching center (MSC)/visitor location register (VLR), which is connected to a gateway MSC (GMSC). The Visitor Location Register (VLR) is the serving networks 'copy' of the subscriber's Home Location Register. The subscriber data needed to offer the subscriber its services are copied from the HLR and stored here. Both the MSC and the SGSN have VLRs connected to them. Stored in the VLR is the following data: International Mobile Subscriber Identity (IMSI); Mobile Station International ISDN Number (MSISDN); Temporary Mobile Subscriber Identities (TMSI) if any; Current Location Area (LA) of the subscriber; and, Current SGNS node to which the subscriber is connected.

In the non-limiting example shown in FIG. 1B, radio access network 24 comprises one or more radio network controller (RNC) nodes 26 and one or more base station nodes 28, e.g., Node_Bs or B-nodes. The base station nodes 28 of radio access network 24 communicate over Uu radio interface with wireless terminals, one example being user terminal 13. Wireless user terminal 13 is also referred to in the WCDMA literature and herein as a "user equipment unit" or "UE". It will be appreciated that typically radio access network 24 comprises plural radio network controller (RNC) nodes 26, which each radio network controller (RNC) node 26 generally serving more than one base station node 28. Moreover, radio network controller (RNC) nodes 26 can be connected to one another over an Iur interface. Further, in some example embodiments such as those encompassed by the EPS and Long Term Evolution (LTE) version of WCDMA, radio base station nodes 28 are connected directly to a core network rather than to radio network controller (RNC) nodes. In EPS/LTE, in general functions of a radio network controller (RNC) node are performed by the radio base stations nodes. As such, in the LTE versions the radio access network (RAN) of an LTE system has an essentially "flat" architecture comprising radio base station nodes without reporting to radio network controller (RNC) nodes. The present technology is fully capable of implementation both in LTE and non-LTE (e.g., RNC-populated) versions of radio access network 24. EPS/LTE is described in more detail in 3GPP TS 23.401 and 23.402, both of which are incorporated herein by reference in their entirety.

As further shown by FIG. 1B, telecommunications network 10T can be connected both to external networks 32 and to equipment or facilities known as home environment 34 for user terminal 13. Although not shown in detail, external networks 32 are known to comprise IP Internet, other operator('s)(s') network, and landline systems such as PLMN, PSTN, and ISDN. Home Environment (HE) 34 comprises servers and/or other equipment which, e.g., holds service profiles of the operator's subscribers. It also provides Serving Networks with subscriber and billing information needed to authenticate the users and charge them for the services offered. Both services offered and services blocked are listed in home environment 34. In the illustrated, non-limiting example of FIG. 1B, home environment 34 for a particular wireless terminal, e.g., user terminal 13, is shown to comprise home location register (HLR) 36 and a version of the home network entity 11 which is suitable for telecommunications network 10T. For example, home network entity/authentication server (AuC) 11 can be in the form of an AAA server, a HLR/AUC server, an HSS or PKI-server. For sake of convenience, home network entity 11 is also referred to herein as authentication server (AuC) 11, or home network entity/authentication server (AuC) 11. The home location register (HLR) 36 and home network entity/authentication server (AuC) 11 are two logical network nodes but, as in the case shown in FIG. 1B, are often implemented at the same physical node.

The Home Location Register (HLR) 36 is a database in charge of the management of mobile subscribers. A mobile network may consist of many HLRs, depending on the numbers of mobile subscribers, the capacity of each HLR and the internal organization of the network. The database comprises the International Mobile Subscriber Identity, at least one Mobile Subscriber ISDN Number (MSISDN) and at least one Packet Data Protocol (PDP) address. Both IMSI and the MSISDN numbers can be used as keys to access the other information stored. To be able to route and charge calls, the HLR also holds information on which SGSN and VLR that are currently in charge of the subscriber. Other services offered, such as call forwarding, data rates and voice mail are also listed in together with service restrictions, like roaming limitations.

The AKA key manager for user terminal 13 can comprise or be realized as an identity module 58. The identity module 58 can take the form of software executed by processor 60 of user terminal 13, or the form of hardware included in user terminal 13. Alternatively, and as shown by the non-limiting example implementation of FIG. 1B, identity module 58 can be realized by an integrated circuit card/chip such an UICC (Universal Integrated Circuit Card). The UICC (Universal Integrated Circuit Card) is a chip card (e.g., smart card) used in mobile user terminals in GSM and UMTS networks and involves, e.g., in authentication. In a GSM network, the UICC contains a SIM application which holds personal (subscription) information hard-coded onto the card. In a UMTS network the UICC contains the USIM application which includes the UMTS Subscriber Identity Module. The UICC allows for more applications and/or keys/electronic signatures for other purposes stored alongside the USIM on the UICC (e.g. secure banking transactions access codes). It also gives the opportunity to have multiple USIMs on the same UICC, thus providing access to multiple networks. The identity module 58 typically comprises a CPU, ROM, RAM, EEPROM and I/O circuits. The identity module 58 communicates over an interface Cu with its host user terminal 13.

The user terminal 13 further comprises a processor or controller (as those terms are herein expansively elaborated), such as processor 60 of FIG. 1B. Both identity module 58 and processor 60 typically also serves to execute, individually and/or simultaneously, applications 62 stored in appropriate memory or media 64 (or on identity module 58). Of particular interest to the present technology is the fact that different applications can be executed and each afford a different master key for authentication purposes. To this end, FIG. 1B, illustrates plural applications 62, e.g., application $62_1$ through application $62_J$, for example.

In addition to processor 60, which (as indicated above) can comprise AKA key manager 18 and which can execute the applications 62, user terminal 13 typically includes numerous other functionalities, some or all of which may also be realized by processor 60. In addition, the wireless user terminal 13 of FIG. 1B includes transceiver(s) 66 which facilitates one or both of uplink and downlink wireless communications with base station node 28 over the Uu interface.

Thus, as one of its aspects, the technology concerns an entity for operational use with a network. The network can be, in an example embodiment, a telecommunications network or system. In whatever type of network or system it is implemented, the entity comprises a master key memory; an application-specific master key selector; and a further key generator configured to use a master key selected by the application-specific master key to derive the further keys. As used herein, the entity can be either an authentication server (e.g., home network entity/authentication server (AuC) 11 situated, e.g., in home environment 34) [or some substantially equivalent unit], or a wireless user terminal 13 which receives an authentication vector from a corresponding home network entity/authentication server (AuC) 11.

Figure 2:
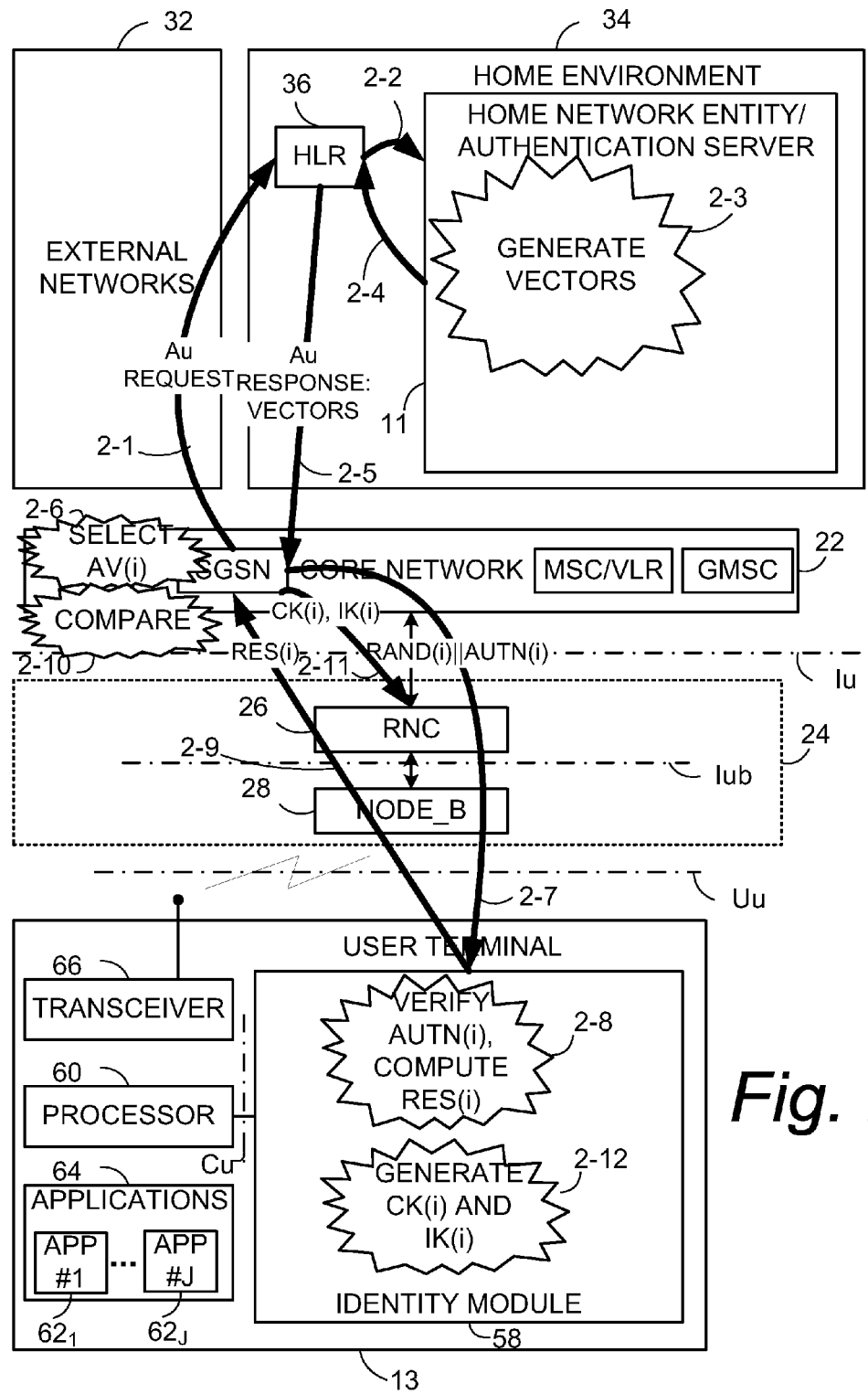
FIG. 2 is a diagrammatic view of an example telecommunications network and further showing basic acts performed in a representative Authentication and Key Agreement (AKA) procedure.

Example major acts of a representative Authentication and Key Agreement (AKA) procedure are illustrated in FIG. 2 for providing a context for further technological aspects described herein. These major acts of the representative Authentication and Key Agreement (AKA) procedure of FIG. 2 are primarily discussed in the context of the telecommunications network 10T of FIG. 1B. However, it should be understood that the technology is not limited or confined to telecommunications networks, but is applicable to networks generally. The major acts of the representative Authentication and Key Agreement (AKA) procedure of FIG. 2 in the telecommunication context of FIG. 1B thus primarily involve the identity module 58, the SGSN/VLR and the home network entity/authentication server (AuC) 11. Authentication and key agreement is managed by the particular VLR/SGSN to which the subscriber is connected.

The VLR/SGSN is in charge of the Authentication and Key Agreement. The VLR/SGSN thus starts the procedures by sending the 'Authentication data request' to the HLR. Act 2-1 of the representative Authentication and Key Agreement (AKA) procedure of FIG. 2 shows the VLR/SGSN in charge of the user terminal 13 sending an 'Authentication data request (IMSI)' to the subscriber's Home Location Register 36. As act 2-2, home location register (HLR) 36 locates the home network entity/authentication server (AuC) 11 that the subscriber data is stored on and asks this centre for a set of authentication vectors ($AV_1, AV_2, \ldots AV_n$).

If the home network entity/authentication server (AuC) 11 has stored authentication vectors for the subscriber, it replies with one or more of the authentication vectors, or else it generates the authentication vectors. Multiple authentication vectors (up to five) will typically be returned at a time, but if the current load on the AuC is high, it might return just one. More AVs will then be generated when the processing load diminish and will be ready for future queries. Thus, act 2-3 reflects home network entity/authentication server (AuC) 11 generating the set of authentication vectors ($AV_1, AV_2, \ldots AV_n$); act 2-4 depicts home network entity/authentication server (AuC) 11 sending the set of authentication vectors ($AV_1, AV_2, \ldots AV_n$) to home location register 36.

Act 2-5 involves home location register (HLR) 36 answering act 2-1 with an 'Authentication data response ($AV_1, AV_2, \ldots AV_n$)' which includes the set of authentication vectors ($AV_1, AV_2, \ldots AV_n$) generated by home network entity/authentication server (AuC) 11.

Upon receipt of the 'Authentication data response ($AV_1, AV_2, \ldots AV_n$)' from home location register (HLR) 36, as act 2-6 the SGSN/VLR stores the set of authentication vectors ($AV_1, AV_2, \ldots AV_n$) in its database and selects one of the authentication vectors (typically the first) to be the authentication vector AV(i) for use. As act 2-7 the VLR/SGSN sends a 'User authentication request" including two parameters RAND(i)||AUTN(i) obtained from the selected authentication vector to identity module 58, the transmission of these values being through the radio access network 24, e.g., through base station node 28 and to/through user terminal 13.

Upon receipt of the 'User authentication request (RAND (i)||AUTN(i)' from the VLR/SGSN, the identity module 58 of user terminal 13 (which, in one example implementation, in the UICC [Universal Integrated Circuit Card]) verifies the Authentication Token to authenticate the home network. This is done by showing knowledge of a secret key indirectly. The authentication of the network is the first part of the two-way authentication in the one-pass message flow. The identity module 58 then generates the response to be sent back to the VLR/SGSN. Thus, act 2-8 of FIG. 2 shows identity module 58 verifying the AUTN(i) and computing a user response value RES(i). Then, as act 2-9, identity module 58 sends back an 'User authentication response (RES(i))' to the VLR/SGSN.

As act 2-10, the SGSN/VLR compares the received user response value RES(i) to its own stored XRES(i) to authenticate the user. If RES(i) and the stored XRES(i) are equal, the network has authenticated the subscriber. The VLR/SGSN then gets the cipher and integrity keys from the same AV, AV(i) and as act 2-11 sends the cipher and integrity keys to the RNC currently holding the subscriber. These are then used for ciphering the communication and integrity checking of the messages.

As act 2-12 the identity module 58 uses the received RAND(i)||AUTN(i) values to generate the cipher and integrity keys, CK and IK. Also, the VLR/SGSN retrieves the CK and IK of the current AV.

Figure 3:
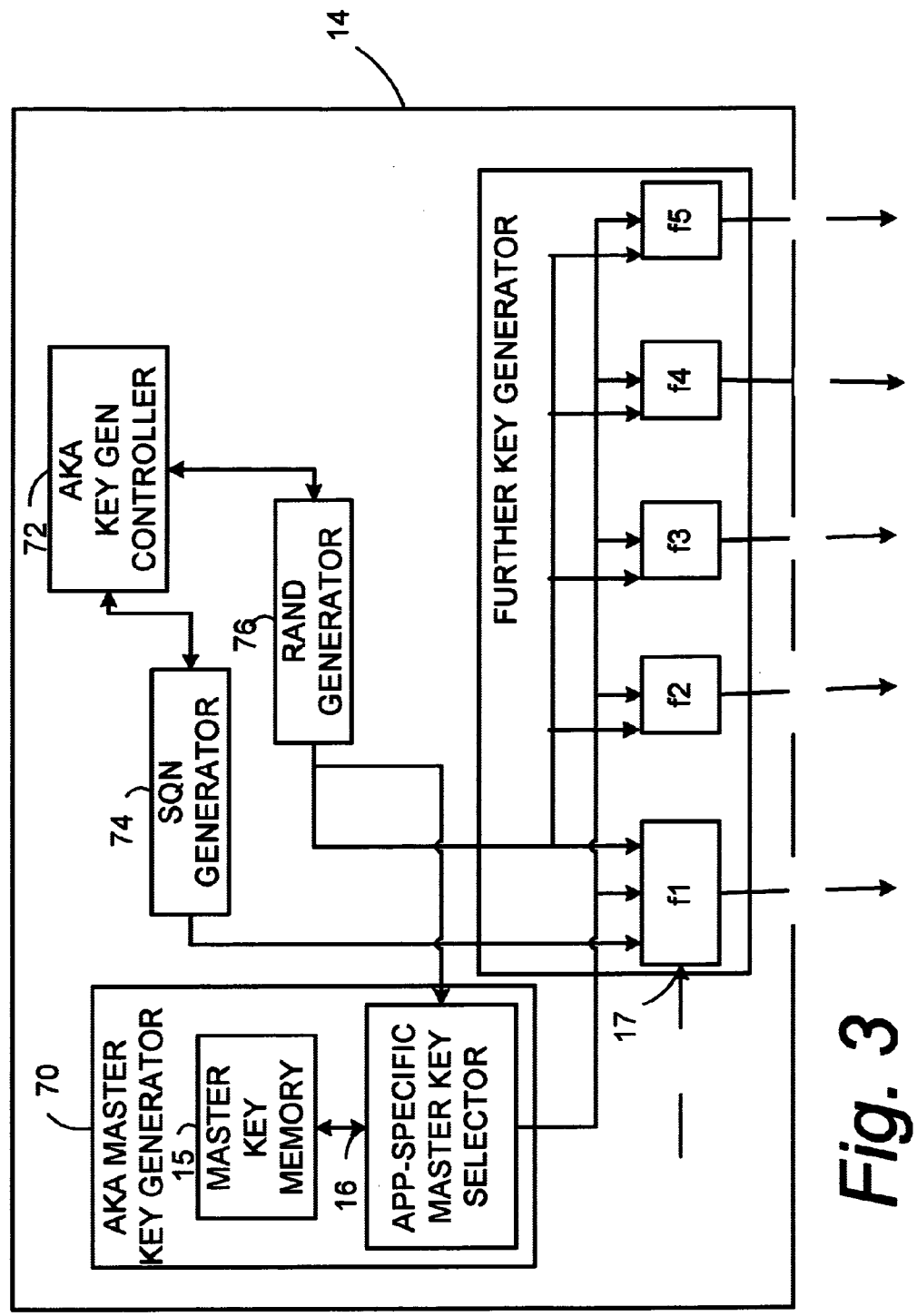
FIG. 3 is a diagrammatic view of an example embodiment of a AKA key generator.

FIG. 3 shows an example, non-limiting embodiment of AKA key generator 14. The AKA key generator 14 comprises AKA master key generator 70; AKA key generation controller 72; SQN generator 74; random number RAND generator 76; and the previously mentioned AuC further key generator 17. The AKA master key generator 70 comprises the previously mentioned AuC master key memory 15 and AuC application-specific master key selector 16.

The structure and operation of AuC further key generator 17 in particular is understood with reference to and descriptions of the set of cryptographic functions and algorithms comprising the conventional Authentication and Key Agreement (AKA) and Table 1. FIG. 3 shows that five of these functions are involved in AuC further key generator 17: functions f1 through f5.

TABLE 1

AKA FUNCTIONS WITH THEIR OUTPUTS

| Function | Description | Output |
| --- | --- | --- |
| f0 | The random challenge generating function | RAND |
| f1 | The network authentication function | MAC-A/ XMAC-A |
| f1* | The re-synchronization message authentication function | MAC-S/ XMAC-S |
| f2 | The user authentication function | RES/XRES |
| f3 | The cipher key derivation function | CK |
| f4 | The integrity key derivation function | IK |
| f5 | The anonymity key derivation function | AK |
| f5* | The anonymity key derivation function for the re-synchronization message function | AK |
| f8 | The confidentiality function | <Enciphered data> |
| f9 | The integrity checksum generating function | MAC-I/ XMAC-I |

Returning to the AKA key generator 14 of FIG. 3, SQN generator 74 is connected to supply its SQN value to AuC application-specific master key selector 16 and to function f1 of AuC further key generator 17. The RAND generator 76 is connected to supply its random number RAND to AuC application-specific master key selector 16 and to each of the functions f1 through f5 comprising AuC further key generator 17. The f1 also receives a AMF parameter.

When generating a new authentication vector the home network entity/authentication server (AuC) 11 reads the stored value of the sequence number, $SQN_{HE}$ and then generates a new SQN (in integer succession to $SQN_{HE}$) and a random challenge RAND. Together with the stored authentication vectors and Key Management Field (AMF) and the pre-shared secret key (K), these four input parameters are ready to be used.

The functions use these inputs and generate the values for the message authentication code, MAC-A, the expected result, X-RES, the Cipher Key (CK), the Integrity Key (IK) and the Anonymity Key (AK). With the SQN⊕AK, AMF and MAC, the Authentication Token, AUTN can be made. AUTN comprises these three parameters (SQN⊕AK, AMF and MAC) concatenated.

Figure 4:
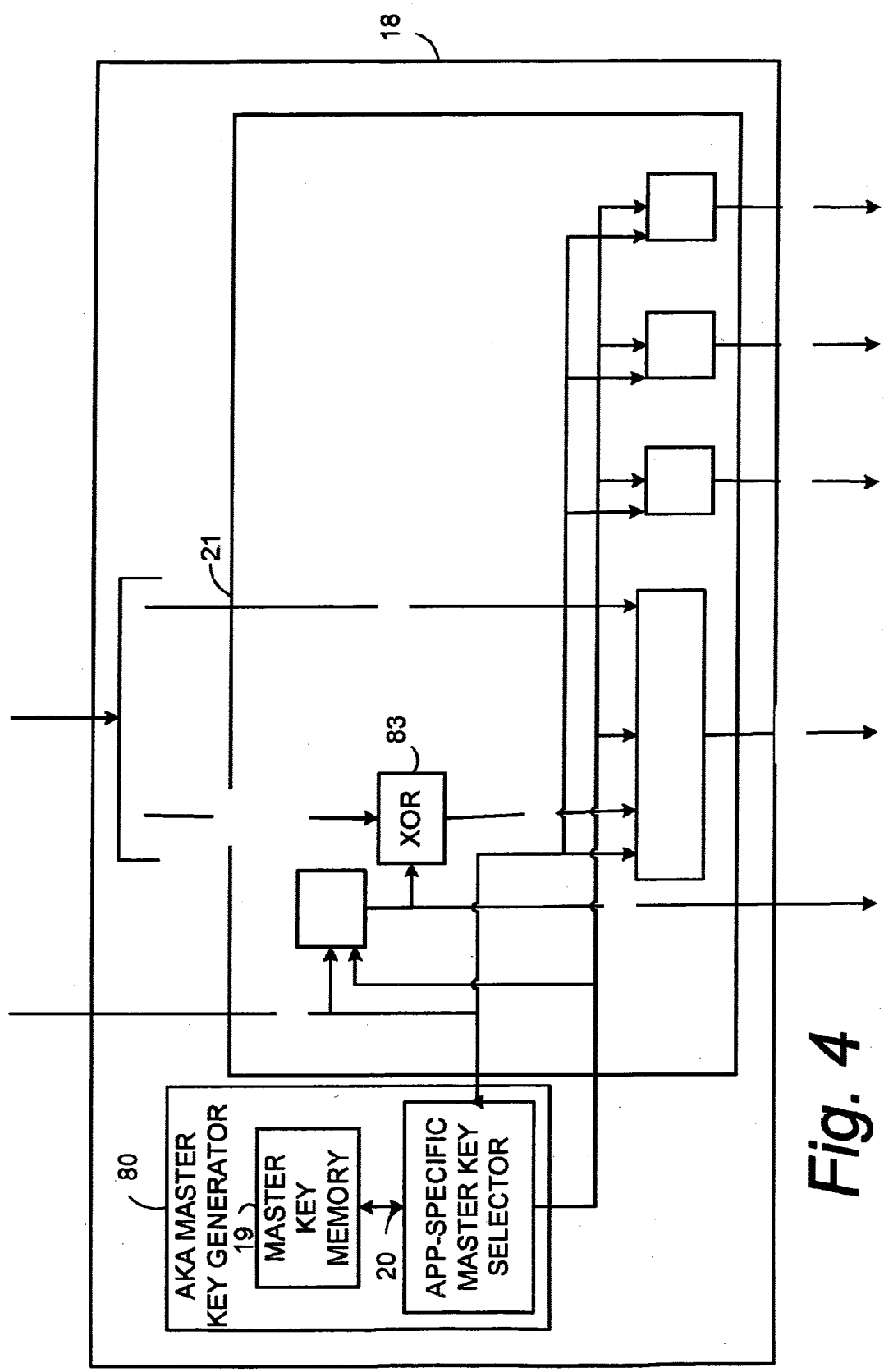
FIG. 4 is a diagrammatic view of an example embodiment of a AKA key manager for a user terminal.

FIG. 4 shows an example, non-limiting embodiment of AKA key manager 18 which typically resides in identity module 58 (e.g., in a Universal Integrated Circuit Card in an example implementation). The AKA key manager 18 comprises terminal master key generator 80 and the previously mentioned terminal further key generator 21. The AKA master key generator 80 comprises the previously mentioned terminal master key memory 19 and terminal application-specific master key selector 20. The terminal further key generator 21 comprises the functions f1 through f5, as well as XOR gate 83.

The AKA key manager 18 needs only four parameters to generate its output keys: its pre-shared secret key (K) and three parameters which it receives from home network entity/authentication server (AuC) 11 via the RAND(i)∥AUTN(i) values. When AKA key manager 18 receives the (RAND∥AUTN) pair, the AKA key manager 18 generates the Anonymity Key (AK) by applying function f5 to the received RAND. and K By XORing the AK with the (SQN⊕AK) from the Authentication Token, the sequence number (SQN$_{HE}$) is obtained. The secret key K is then used with the received AMF, SQN and RAND(i) parameters to generate the Expected Message Authentication Code (XMAC-A). This is then compared with the MAC-A. If the X-MAC and MAC match, the AKA key manager 18 can authenticate that the message (RAND∥AUTN pair) originated in its Home Environment (and thereby connected to a trusted Serving Network) and the key generating functions can continue.

Figure 5:
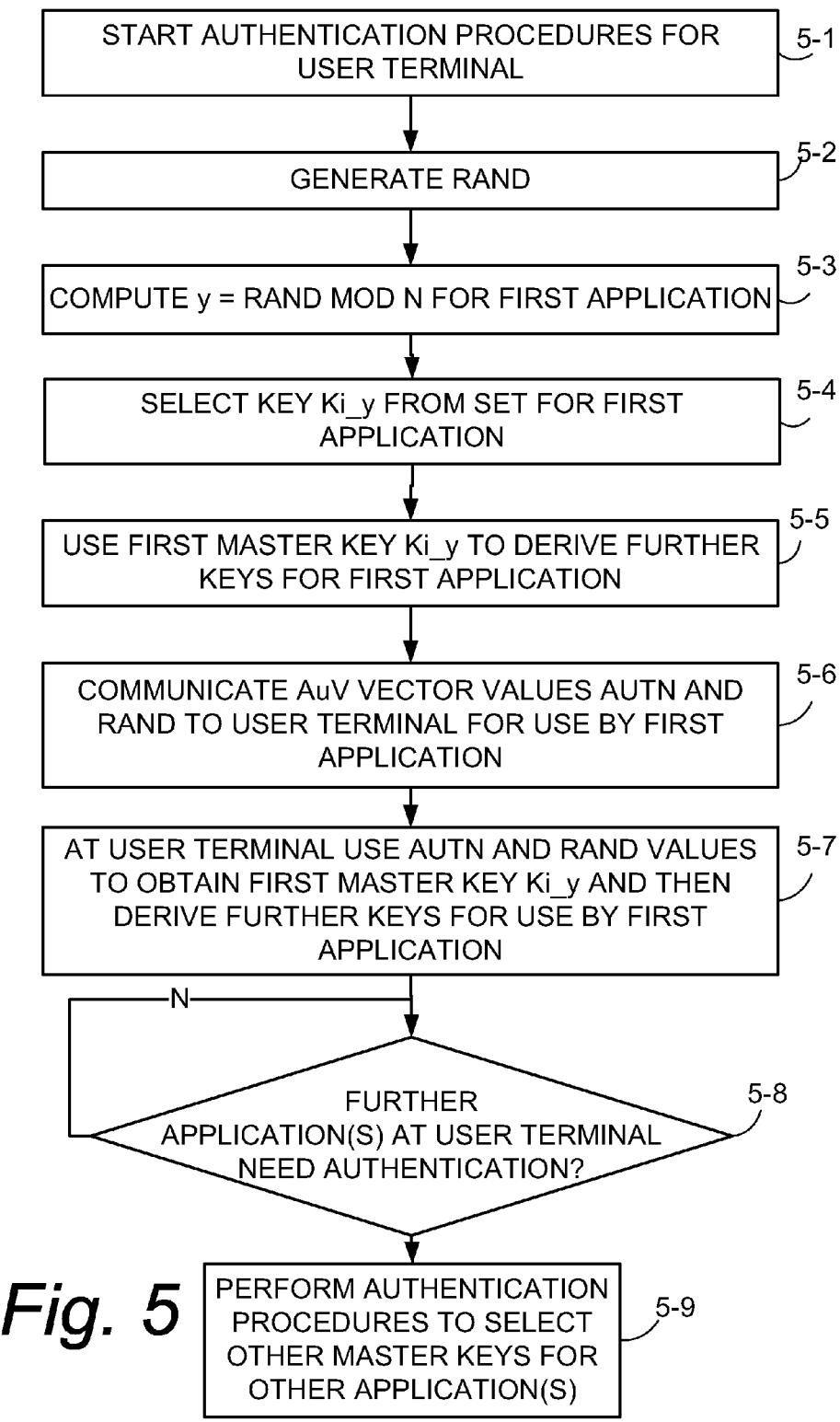
FIG. 5 is a flowchart showing example, basic acts or steps which can be performed in conjunction with a representative AKA key generation procedure.

FIG. 5 shows example, basic acts or steps which can be performed in conjunction with a representative AKA key generation procedure of the present technology. The AKA key generation procedure advantageously serves to select a new (possibly unique) master key each time AKA is run for any application. In order to introduce such higher security and greater flexibility in the AKA key generation procedure, the end user is assigned (e.g., pre-assigned) N number of Ki master keys. These keys reside both on the user's equipment (terminal, USIM/ISIM card or SmartCard) and in a specialized authentication server in the user's home network. For example, the N number of master keys can be stored in master key memory 19 of identity module 58 and in AuC master key memory 15 of authentication server 11. By way of example terminology, the range of master keys assigned to an end-user is [Ki_1, Ki_2 . . . , Ki_n]. As explained herein, subsequent keys such as Ck and Ik (in AKA) can be derived from any of these master keys.

Starting or initiation of the AKA key generation procedure is depicted by act 5-1 of FIG. 5. It is presumed that the starting of the AKA key generation procedure occurs in conjunction with execution of a first application, e.g., application $62_1$, at wireless terminal 13. The acts of FIG. 5 through and including act 5-6 are thus associated with authentication (e.g., obtaining authentication keys) for the first application $62_1$. Such starting act 5-1 can include, for example, acts 2-1 through 2-2 of the Authentication and Key Agreement (AKA) procedure of FIG. 2. Further, it is presumed at this point that a set of N plural number of master keys have been provided to and/or stored both to/by wireless terminal 13 and to home network entity/authentication server (AuC) 11 for the user terminal, e.g., to terminal master key memory 19 and AuC master key memory 15, respectively.

Act 5-2 of AKA key generation procedure comprises generating a random number RAND. The random number RAND is generated by the network authentication server (e.g. home network entity/authentication server (AuC) 11).

In the illustrated example embodiment, the random number RAND is preferably generated by RAND generator 76 of AKA key generator 14. The random number RAND is applied, e.g., to AuC application-specific master key generator 16.

Act 5-3 of AKA key generation procedure comprises computation of a modulo function y=(RAND mod N) by AuC application-specific master key generator 16. The result of the computation, i.e., the value of "y", is the rank or position of the one of the plural N number of master keys which is selected for the first application $62_1$. The selected position in the user's master key range is calculated from a modulo function as y=(RAND mod N). Thus, as depicted by act 5-4, the key selected from [Ki_0, Ki_1 . . . , Ki_N−1] will be in position, y, i.e. Ki_y. For example, if the evaluation of the modulo function y=(RAND mod N) results in y having the value of three, then the fourth master key in the set [Ki_0, Ki_1 . . . , Ki_N−1], i.e. Ki_3, is selected as the master key for the first application $62_1$. The first master key chosen for the first application $62_1$ is herein denoted as first master key Ki_y.

Act 5-5 comprises using the first master key Ki_y to derive further authentication keys for the first application $62_1$, including the cipher key (CK) and the integrity key (IK). These further keys are generated by AuC further key generator 17 in known manner.

The home network entity/authentication server (AuC) 11 generates the authentication vector(s) in a manner previously such as that described with reference to act 2-3 of FIG. 2, for example. Such authentication vector(s) (AV) are communicated to the SGSN/VLR, which (as previously explained) selects one of the vectors for use for the first application and then sends the vector parameters RAND(i)∥AUTN(i) to identity module 58 in a manner such as that depicted by act 2-7. Act 5-6 thus involves communication of parameters of the selected authentication vector (AV), e.g., RAND(i)∥AUTN(i) to identity module 58.

Upon receipt of the parameters of the selected authentication vector (AV), e.g., RAND(i)∥AUTN(i), the identity module 58 of wireless terminal 13 computes the first master key for the first application, and uses the first master key to derive further keys (e.g., the CK and IK keys) for the first application. Act 5-7 of FIG. 5 depicts identity module 58 obtaining the first master key and further keys for the first application. The identity module 58 actually obtains the first master key in the same manner as does home network entity/authentication server (AuC) 11: calculation of the modulo function as y=(RAND mod N). The RAND value for the calculation of the modulo function is obtained from the selected authentication vector (AV), and the set of plural master keys [Ki_0, Ki_1 . . . , Ki_N−1] is stored in terminal master key memory 19. Therefore, as act 5-7 the identity module 58 can perform essentially the same acts as act 5-3 and act 5-4 to obtain the first master key for the first application, and then can perform an act comparable to act 5-5 to obtain the further keys for the first application.

The AKA key generation procedure could stop at this point. But given that there may be and typically is more than one application running on the user terminal and making use of Authentication and Key Agreement (AKA), it might be of interest to the user terminal and the network to avoid re-using a currently selected master key. While not mandatory for any embodiment, the optional advantages of using a unique master key for each application are several, including (for example):

(a) Derived keys used in one application or domain or session are not affected by compromised-keys used in a different application/domain by the same user terminal or user. For example if an unauthorized party obtains Ck and Ik being used by a user terminal for an IMS application, this should not, in principle, compromise derived further keys (e.g., keys Ck' and Ik') used by the same user terminal for GSM or UMTS circuit switch calls.

(b) Possible authentication vector synchronization or sequencing issues are reduced since each subsequently activated application or domain will be using its new keys that are derived from a specific Ki_y which is only being used by one application or domain at any point in time. Currently such authentication vector synchronization or sequencing problems may occur.

From the foregoing, it should be understood that the technology described herein encompasses determining a master key for each application or domain or session. In other words, as used herein, determining a first master key for a first application and then determining another master key for another application is meant to encompass essentially the same procedure of determining a first master key for a first domain and then determining another master key for another domain. For example, if the same application is executed first in a first domain and also in a second domain, a first master key is determined for the first domain and a second (preferably distinct) master key is determined for the second domain. Moreover, as used herein, determining another master key for another application is meant to encompass determining another master key for a different session of the same application as the first application. Thus, whenever another or next application is mentioned herein, such mention is intended to encompass also determining keys for execution of the same or another application in another domain, or execution of another session of the same application in the same or another domain. Thus, in view of the possibility if not likelihood that more than one application is or will be running on the user terminal and making use of Authentication and Key Agreement (AKA), as act 5-8 the AKA key generation procedure checks to see if a further application executed at wireless terminal 13 also requires authentication. If not, the AKA key generation procedure periodically monitors or can be prompted when authentication of another application is necessary. If another application does require authorization, the selection of a different master key may be needed in the authentication procedure towards a different application, as depicted by act 5-9.

Performance of act 5-9 (selecting other master key(s) for other application(s)) can be performed in various ways. Each of FIG. 5A, FIG. 5B, and FIG. 5C represent or correspond to alternate embodiments or modes for performing act 5-9, e.g., for the selecting of master key(s) for other application(s).

Figure 5A:
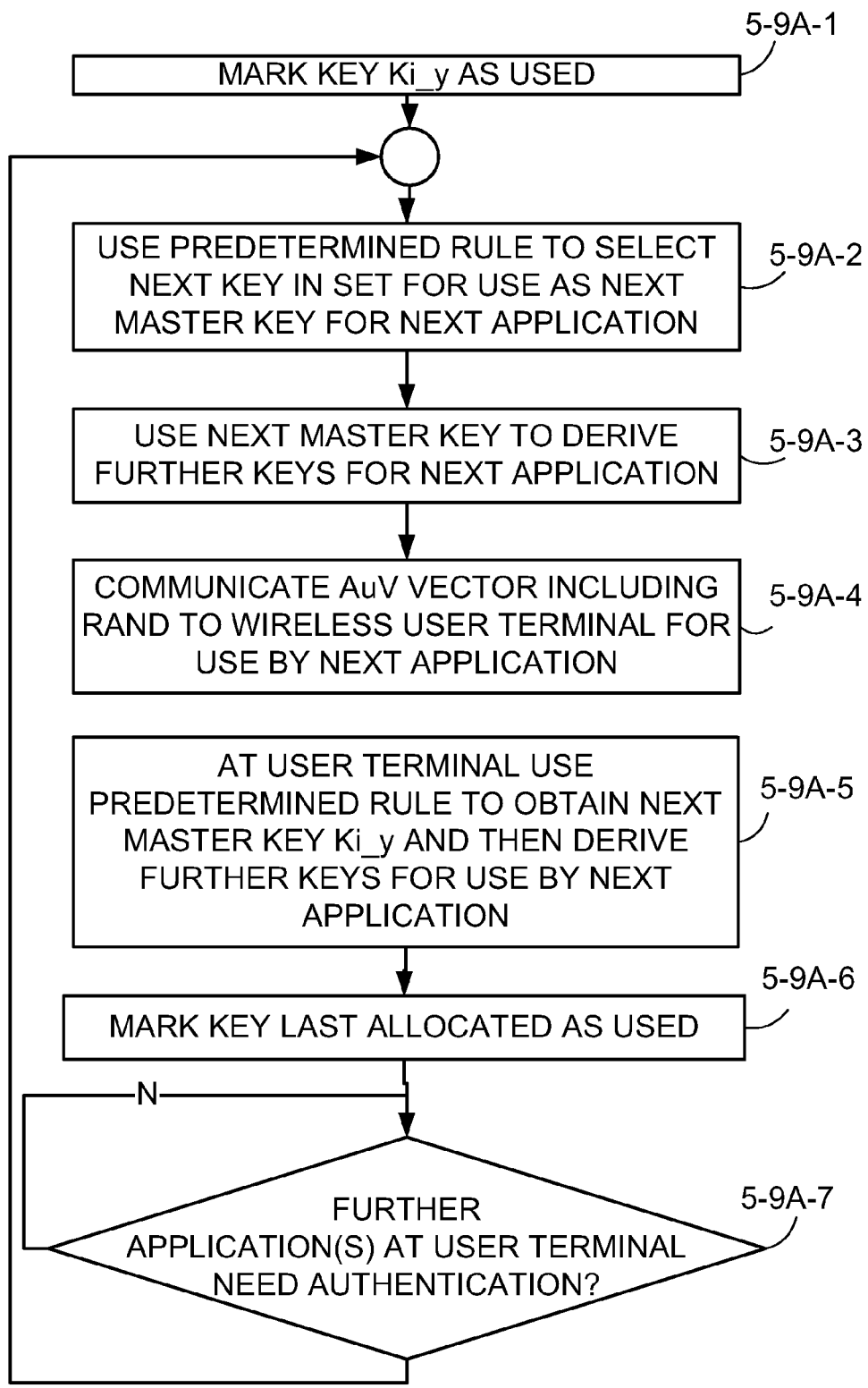
FIG. 5A is a flowchart showing example, basic acts or steps which can be performed in conjunction with selection of a master key for a next application in accordance with an alternative example embodiment of the representative AKA key generation procedure of FIG. 5.
Figure 5B:
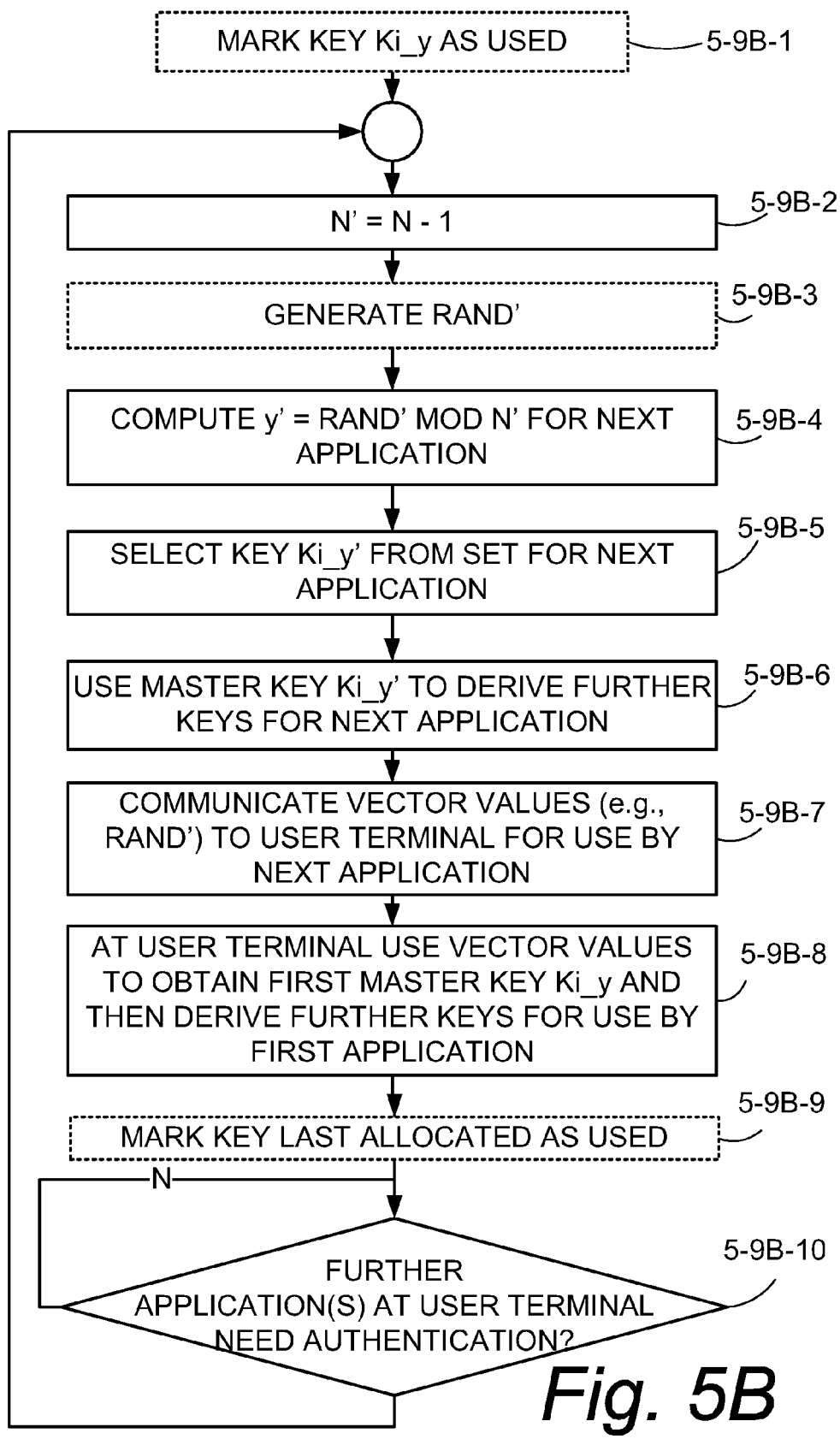
FIG. 5B is a flowchart showing example, basic acts or steps which can be performed in conjunction with selection of a master key for a next application in accordance with another alternative example embodiment of the representative AKA key generation procedure of FIG. 5.
Figure 5C:
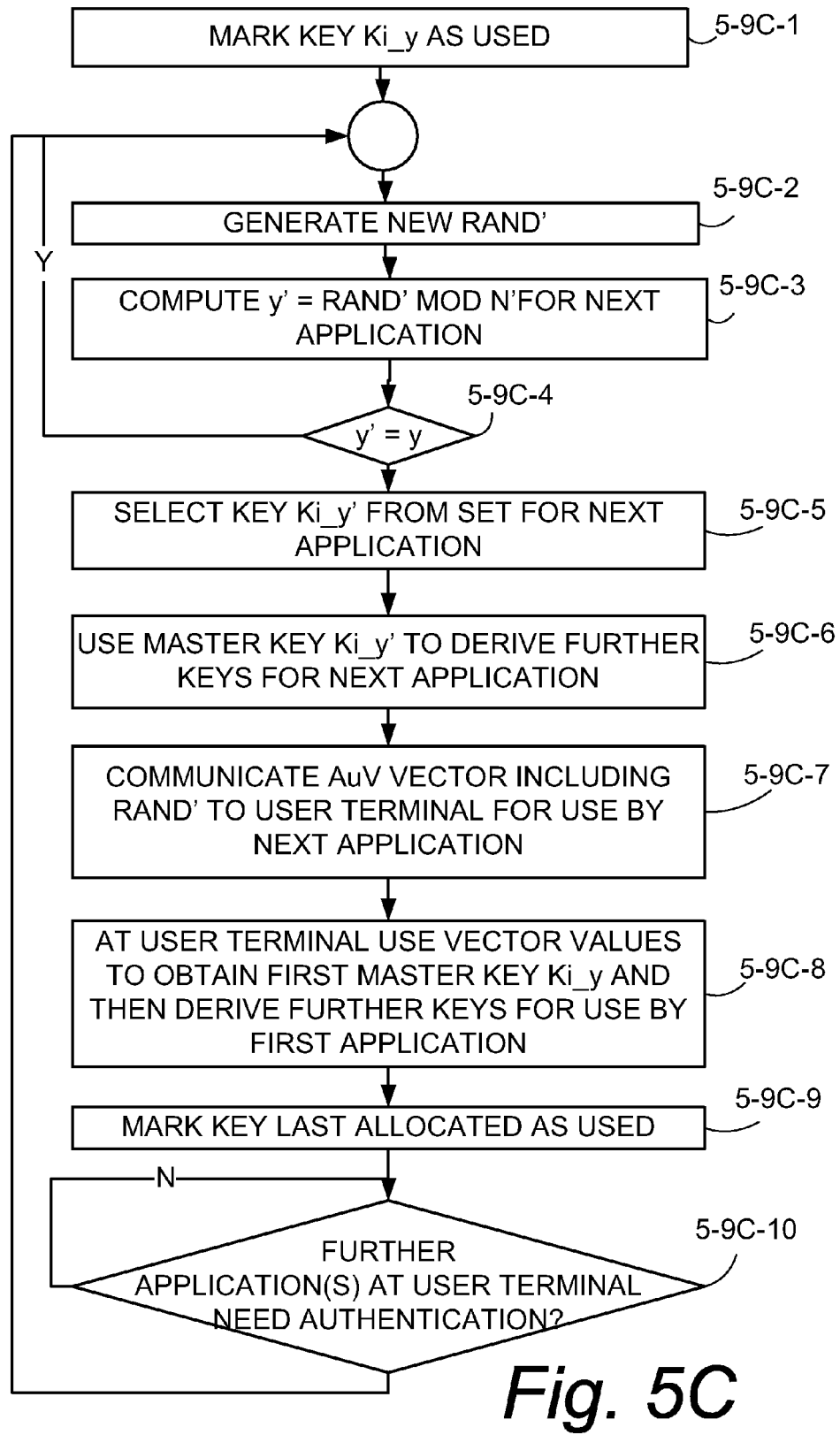
FIG. 5C is a flowchart showing example, basic acts or steps which can be performed in conjunction with selection of a master key for a next application in accordance with yet another alternative example embodiment of the representative AKA key generation procedure of FIG. 5.

FIG. 5A shows example steps or subacts which can be performed by AKA key generator 14 according to another example embodiment in conjunction with execution or fulfillment of act 5-9 of FIG. 5 for obtaining a master key and further keys for a next application. As subact 5-9A-1, the key selected as the master key for the first application, i.e., Ki_y, is marked or tagged as being used (and hence unavailable for use by other applications/domains). Then, as subact 5-9A-2, the AuC application-specific master key selector 16 selects a next key in the set for use as the next master key for the next application. For example, if in accordance with act 5-3 through act 5-6 of FIG. 5 the first master key Ki_y occupies the y-th position of the master key set [Ki_0, Ki_1 . . . , Ki_N−1], for one example implementation the second master key for the second application could occupy the (y+1)th position of the set [Ki_0, Ki_1 . . . , Ki_N−1]. In such implementation, the next master key would be key Ki_y+1. Whereas the determination of the next position in this example implementation is simple incrementation of the position number or order, any other predetermined selection logic could also be used. Moreover, inasmuch as the acts of FIG. 5A can be executed for the second, third, and even further applications, and thus in a sense the acts pertain to the "next" application, the next position will generically be referred to as position y', and the next master key selected corresponding to the position y' will be referred to as master key Ki_y'.

Thus, as explained above, subact 5-9A-2 involves selecting the next master key from the set using a predefined rule, such as incrementation or other mathematical manipulation of the position order of the previously selected key. The present embodiment is not confined to any particular predetermined rule. In the incrementation implementation, the next master key is generically referred to as key Ki_y'.

Subact 5-9A-3 of the routine of FIG. 5A involves using the next master key Ki_y' to derive further keys for the next application. Such further keys, such as the CK and IK keys, are derived by AuC further key generator 17 in the manner previously explained. In the course of the Authentication and Key Agreement (AKA) procedure, the AUTN and RAND values of the authentication vector (AV) selected by the SGSN are transmitted to identity module 58 of user terminal 13 as indicated by subact 5-9A-4. However, the authentication vector information need not be used by user terminal 13 to select the master key for the next application. Rather, as indicated by subact 5-9A-5, the user terminal application-specific master key selector 20 of user terminal 13 applies the predetermined rule as criteria for selecting the appropriate ordered key in the set [Ki_0, Ki_1 . . . , Ki_N−1]. Thus, knowing that the previous master key had position y in the set, and further knowing that the predetermined rule for the example implementation is incrementation of position order, as subact 5-9A-5 the user terminal application-specific master key selector 20 selects the y+1 position key, e.g., key Ki_y+1 for the second application (generically referred to as key Ki_y'). Further, as part of subact 5-9A-5, the terminal further key generator 21 of user terminal 13 uses the just-determined master key Ki_y' to derive the further keys for use by the next application. Derivation of the further keys may utilize information included in the authentication vector received as subact 5-9A-4.

As subact 5-9A-6, the AKA key generation procedure marks the just-allocated master key as used, so that the master key allocated by this most recent execution of the routine of FIG. 5A will be unavailable for other applications or domains. Then, as subact 5-9A-7, the AKA key generation procedure checks to see if a further application executed at wireless terminal 13 also requires authentication. If not, the AKA key generation procedure periodically monitors or can be prompted when authentication of another application is necessary. If another application does require authorization, key selection routine of FIG. 5A is repeated for the further application.

FIG. 5B shows example steps or subacts which can be performed by AKA key generator 14 according to another example embodiment and in conjunction with execution or fulfillment of act 5-9 of FIG. 5 for obtaining a master key and further keys for a next application. As optional subact 5-9B-1, the key selected as the master key for the first application, i.e., Ki_y, is marked or tagged as being used (and hence unavailable for use by other applications/domains). Then, as subact 5-9B-2, the AuC application-specific master key selector 16 computes a new value N' by decrementing the previous value N, i.e., N'=N−1. It will be recalled that N is the number of master keys residing in the master key set [Ki_0, Ki_1 . . . , Ki_N−1] which is stored both at AuC master key memory 15 and user terminal master key memory 19. As optional subact 5-9B-3, the AKA key generation procedure can generate a new value of RAND if it so desires. However, a distinguishing aspect of this second embodiment of further master key generation is the computation of a new position value y' as depicted in subact 5-9B-4. In particular, as subact 5-9B-4 the AKA key generation procedure computes the new position value y' for the next application as y'=RAND modulo N'. In view of the value of N' now being different than the previously used value N, the modulo operator for the computation of y' is different, and thus a new position order y' is computed as subact 5-9B-4. Therefore, with a new position order y' having been computed as subact 5-9B-4, a new key Ki_y' is selected as subact 5-9B-5 for the next application. Alternatively, a similar approach could be implemented by using the SQN sequence numbers encoded into each AUTN value associated with each RAND. For instance, if the initial master key associated with SQN=S was Ki_y, then the master key used with SQN=S' would be Ki_y', where y'=(y+S'−S) mod N and so on.

The remaining subacts of the routine of FIG. 5B are essentially similar to acts previously described. For example, as subact 5-9B-6 the AKA key generation procedure uses the next master key Ki_y' to derive further authentication keys for the next application, including the cipher key (CK) and the integrity key (IK). These further keys are generated by AuC further key generator 17 in known manner. Subact 5-9B-7 involves communication of the authentication vector AV for the next application to user terminal 13, which occurs essentially in the manner previously described (and understood, for example, with reference to act 2-4 through act 2-7 of FIG. 2).

Upon receipt of the parameters of the selected authentication vector (AV), e.g., RAND(i)∥AUTN(i), as subact 5-9B-8 the identity module 58 of wireless terminal 13 computes the next master key for the next application, and uses the next master key to derive further keys (e.g., the CK and IK keys) for the next application. The identity module 58 obtains the next master key in the same manner as does home network entity/authentication server (AuC) 11: calculation of the modulo function as y'=(RAND mod N'). In one example implementation, the RAND value for the calculation of the modulo function is obtained from the selected authentication vector (AV). In another mode, the previously used value of RAND can be re-used by coordinated or predetermined agreement. Therefore, as subact 5-9B-8 the identity module 58 can perform essentially the same acts as subact 5-9B-4 and subact 5-9B-5 to obtain the next master key for the next application, and then can perform an act comparable to subact 5-9B-6 to obtain the further keys for the next application.

As subact 5-9B-9, the AKA key generation procedure has the option of marking the just-allocated master key as used, so that the master key allocated by this most recent execution of the routine of FIG. 5B will be unavailable for other applications or domains. Then, as subact 5-9B-10, the AKA key generation procedure checks to see if a further application executed at wireless terminal 13 also requires authentication. If not, the AKA key generation procedure periodically monitors or can be prompted when authentication of another application is necessary. If another application does require authorization, key selection routine of FIG. 5B is repeated for the further application.

Thus, the routine of FIG. 5B essentially involves a repetition of the routine of FIG. 5 but with a new RAND value (RAND') generated by both user terminal 13 and home network entity/authentication server (AuC) 11. If the selected position y' yields a master key tagged as not available, then the process is repeated until a non-tagged master key is returned. Each repetition requires a new RAND value (RAND') generated in home network entity/authentication server (AuC) 11.

FIG. 5C shows example steps or subacts which can be performed by AKA key generator 14 according to yet another example embodiment and in conjunction with execution or fulfillment of act 5-9 of FIG. 5 for obtaining a master key and further keys for a next application. As subact 5-9C-1, the key selected as the master key for the first application, i.e., Ki_y, is marked or tagged as being used (and hence unavailable for use by other applications/domains). Then, as subact 5-9C-2, AKA key generation procedure prompts RAND generator 76 of AKA key generator 14 to generate a new RAND' value, e.g., a RAND' value for the next application which is different from that of the first application. Following, as subact 5-9C-3, the AuC application-specific master key selector 16 computes a new position value y' for the next application as y'=RAND' modulo N. A new position order y' is computed as subact 5-9C-3. As subact 5-9C-4, the AKA key generation procedure checks whether the new position order y' as computed by subact 5-9C-3 is the same as the previous or other marked key value of the set, e.g., whether y'=y or y' is the same as any position order of any previously used and marked master keys. If the check of subact 5-9C-4 is affirmative, e.g., if the new position order y' has been used before, execution returns to subact 5-9C-2 for generation of another RAND' value for the next application. If the check of subact 5-9C-4 is negative, the execution of the routine of FIG. 5C continues with subact 5-9C-5 which comprises usage of the new position order y' to select a new key Ki_y' for the next application.

The remaining subacts of the routine of FIG. 5C are essentially similar to acts previously described. For example, as subact 5-9C-6 the AKA key generation procedure uses the next master key Ki_y' to derive further authentication keys for the next application, including the cipher key (CK) and the integrity key (IK). These further keys are generated by AuC further key generator 17 in known manner. Subact 5-9C-7 involves communication of the authentication vector AV for the next application to user terminal 13, which occurs essentially in the manner previously described (and understood, for example, with reference to act 2-4 through act 2-7 of FIG. 2).

Upon receipt of the parameters of the selected authentication vector (AV), e.g., RAND(i)∥AUTN(i), as subact 5-9C-8 the identity module 58 of wireless terminal 13 computes the next master key for the next application, and uses the next master key to derive further keys (e.g., the CK and IK keys) for the next application. The identity module 58 obtains the next master key in the same manner as does home network entity/authentication server (AuC) 11: calculation of the modulo function as y'=(RAND' mod N). Therefore, as subact 5-9C-8 the identity module 58 can perform essentially the same acts as subact 5-9C-3 and subact 5-9C-5 to obtain the next master key for the next application, and then can perform an act comparable to subact 5-9C-6 to obtain the further keys for the next application.

As subact 5-9C-9, the AKA key generation procedure of the routine of FIG. 5C marks the just-allocated master key as used, so that the master key allocated by this most recent execution of the routine of FIG. 5C will be unavailable for other applications or domains. Then, as subact 5-9C-10, the AKA key generation procedure checks to see if a further application executed at wireless terminal 13 also requires authentication. If not, the AKA key generation procedure periodically monitors or can be prompted when authentication of another application is necessary. If another application does require authorization, key selection routine of FIG. 5C is repeated for the further application.

Thus, the routine of FIG. 5C essentially involves a repetition of the routine of FIG. 5 but with a tagged master key is temporarily removed from the list or set of master keys so it cannot be selected again. Hence, the number of available master keys is now N−1=N'. The selected position from the range is calculated from a modulo operation, y'=(RAND mod N−1)=(RAND mod N'). It also recommended (but not required) for the routine of FIG. 5C that a new RAND value be generated.

In the foregoing example embodiments which involve a tagging or marking of a master key or of a key position value as being used, such marking or tagging is performed both at home network entity/authentication server (AuC) 11 (e.g., by AKA key generator 14) and at user terminal 13 (by AKA key manager 18).

If an unauthorized third party (e.g., an attacker) tampers with the secret key information selected for the authentication towards a certain access or application, the attacker will not succeed when trying to reuse the key for a different access/application, or even for the same access/application but in a different session. Rather, the attacker will use an incorrect key. If an attacker attempts to use an incorrect key, one of two things can then happen: (1) if the compromised key is already "in use", the authenticator will reject the incorrectly provided authentication data; (2) if the key is not yet used, the response/keys in the user terminal 13 will not match the values held at the network side (e.g., at home network entity/authentication server (AuC) 11), so that the response can then not be used by the attacker, and the authentication will fail.

When the authentication fails because the user is trying to access based on a different key, it has to be considered as a critical case. A post-processing mechanism can be provided to check that the user terminal 13 has derived RES using the network-provided RAND value and a known key (Ki) different than the required one. If this is the case, the operator can take strong measures to reinforce the security information Such post-processing can be internally in the authenticator node or can be delegated to a different entity. A notification mechanism can also be included towards a centralized entity for the operator to take the specific actions (e.g. generate alarms, delete subscription, etc.). Thus, while UMTS AKA already has mutual authentication, the features of the present technology can be seen a strengthening this property.

In another example embodiment, randomly selecting one of the N number of master keys to serve as a first master key comprises plural factors. The plural factors can comprise (1) a random number known to both the user terminal and the home network entity for the user terminal (e.g., the random value RAND such as that described above); and (2) a second factor. In differing implementations, the second factor can be one or more of: (1) user terminal type/identity; (2) access network type; (3) user terminal location; (4) context information for the application being authenticated.

Figure 6:
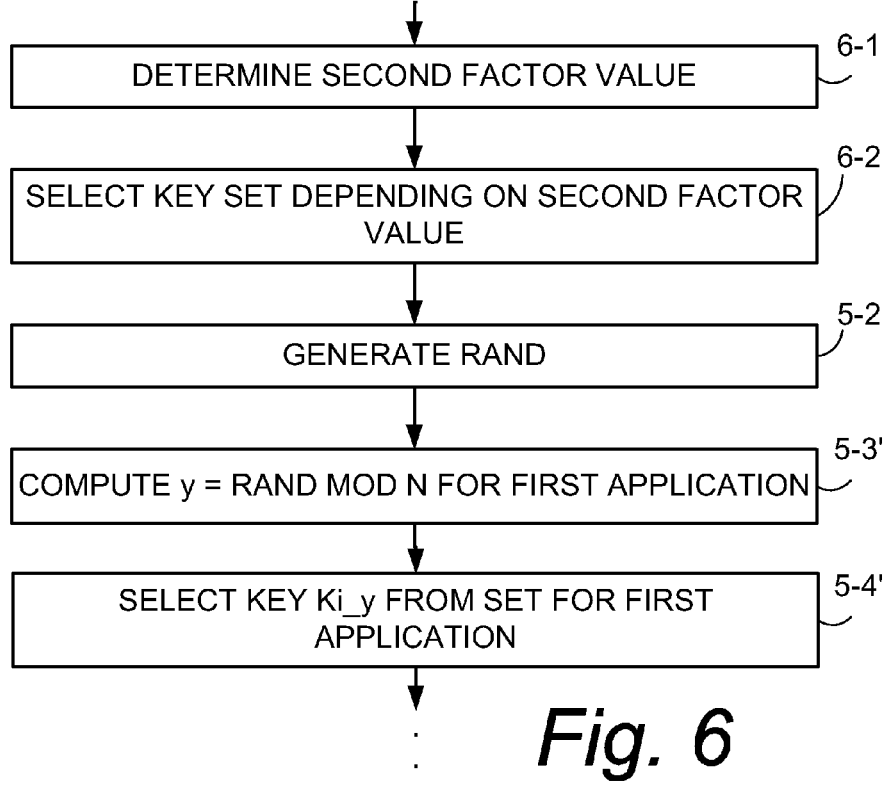
FIG. 6 is a flowchart showing selected, example, basic acts or steps which can be performed in conjunction with a AKA key generation procedure which utilizes plural factors for key selection.
Figure 7:
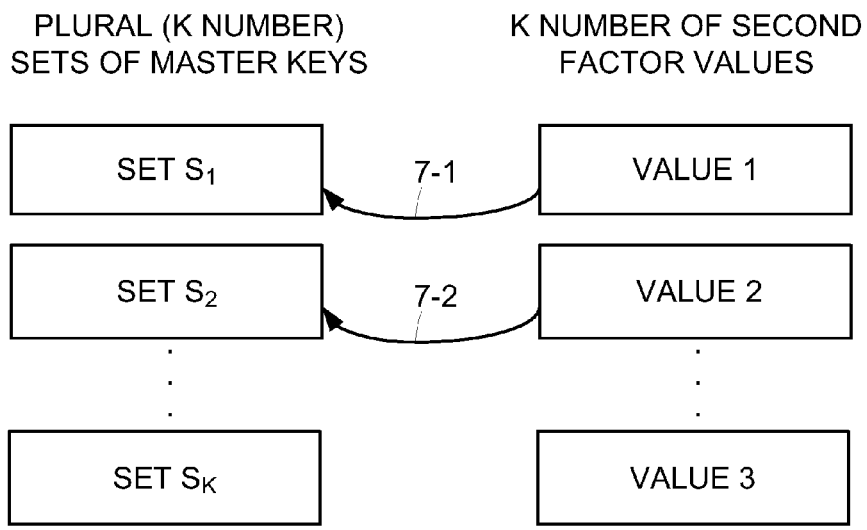
FIG. 7 is a diagrammatic view showing selection of an appropriate set of master keys in dependence upon value of a second factor utilized for key selection.

FIG. 6 together with FIG. 7 shows how the example acts of FIG. 5 can be modified to cater to the embodiments which utilize plural factors to select a master key. In particular, in the plural factors embodiment additional acts 6-1 and 6-2 can be inserted between acts which generally correspond to acts 5-1 and 5-2 of FIG. 5. As act 6-1, a second factor value is determined. As act 6-2, an appropriate one of the master key sets is selected depending on the second factor value determined at act 6-1.

Suppose, for example, that the second factor for master key selection is access network type. Further suppose that there are K number of second factor values, e.g., K number of access network types available to a particular user terminal 13. Thus, as illustrated in FIG. 7, in accordance with an example implementation of the plural factor embodiment, for a user terminal 13 there may be stored (both in AuC master key memory 15 and terminal master key memory 19) K number of possible sets of master keys, e.g., sets $S_1$ through $S_K$. Each set of master keys $S_j$ has a number $N_k$ of possible master keys, and each set $S_j$ of master keys is associated with one of the K number of access network types. If, for example, the access network type through which user terminal 13 seeks authentication is of a first access network type (having second factor value 1), set $S_1$ of master keys is selected by act 6-1 as indicated by arrow 7-1 of FIG. 7. On the other hand, if the access network type through which user terminal 13 seeks authentication is of a second access network type (and thus having a second factor value 2), set $S_2$ of master keys is used (as indicated by arrow 7-2 of FIG. 7), and so forth up to the Kth numbered access network type. Whatever set S is selected based on the second factor value, in this example implementation the set S can be utilized the same way as previously, e.g., using a randomly generated value and the modulo $N_k$ to determine a position value $y_K$ within the selected set, and then using the position value to determine a master key value from the set.

Act 5-3' of FIG. 6 involves computation of a modulo function y=(RAND mod $N_K$) for using the selected set, with the number of elements or keys possibly varying from set to set and thus being denoted as $N_K$. The result of the computation, i.e., the value of "y", is the rank or position of the one of the plural $N_K$ number of master keys which is selected from the selected set S for the first application $62_1$. Thus, as depicted by act 5-4', the key selected from the selected set will be in the y-th position, Ki_y. Other acts of FIG. 5 can follow the acts illustrated in FIG. 6.

As mentioned above, the second factor can be one or more of: (1) user terminal type/identity; (2) access network type; (3) user terminal location; (4) context information for the application being authenticated. Concerning access network type, it is noted that, e.g. WLAN has a range of Ki:s distinct from those eligible for 3G, etc.) Concerning user terminal location, it is noted that certain keys (Ki:s) are only allowed in certain countries or certain VPLMNs. Examples of context information for the application include: e.g. name/ID of the application or application provider, application session ID, user account ID within the application, etc. Other implementations of a plural factor selection embodiment are also possible.

The embodiment of master key selection which involves use of plural factors can have the effect and/or advantage of completely "isolating" keys. For example, even if the "Sweden" key becomes compromised, the "Spain" key is unaffected, etc. Moreover, in the case of, e.g., access-specific keys, and only when the user's subscription is updated to include WLAN access, the WLAN keys are marked as "enabled" in the HSS. In general, the UICC can accordingly be pre-installed with keys "for later activation". For instance, in a military application, keys for emergency missions in foreign countries could be pre-installed, shortening the configuration time when sending troops on a mission.

As a further embodiment, besides having N distinct keys Ki, one could alternatively or additionally have a distinct set of f-algorithms for each Ki. An example home network entity/authentication server (AuC) 11(8) suitable for an embodiment of plural sets of f-functions is illustrated in FIG. 8; an example identity module 58 (e.g., UICC (Universal Integrated Circuit Card)) suitable for a embodiment of plural sets of f-functions is illustrated in FIG. 9.

Figure 8:
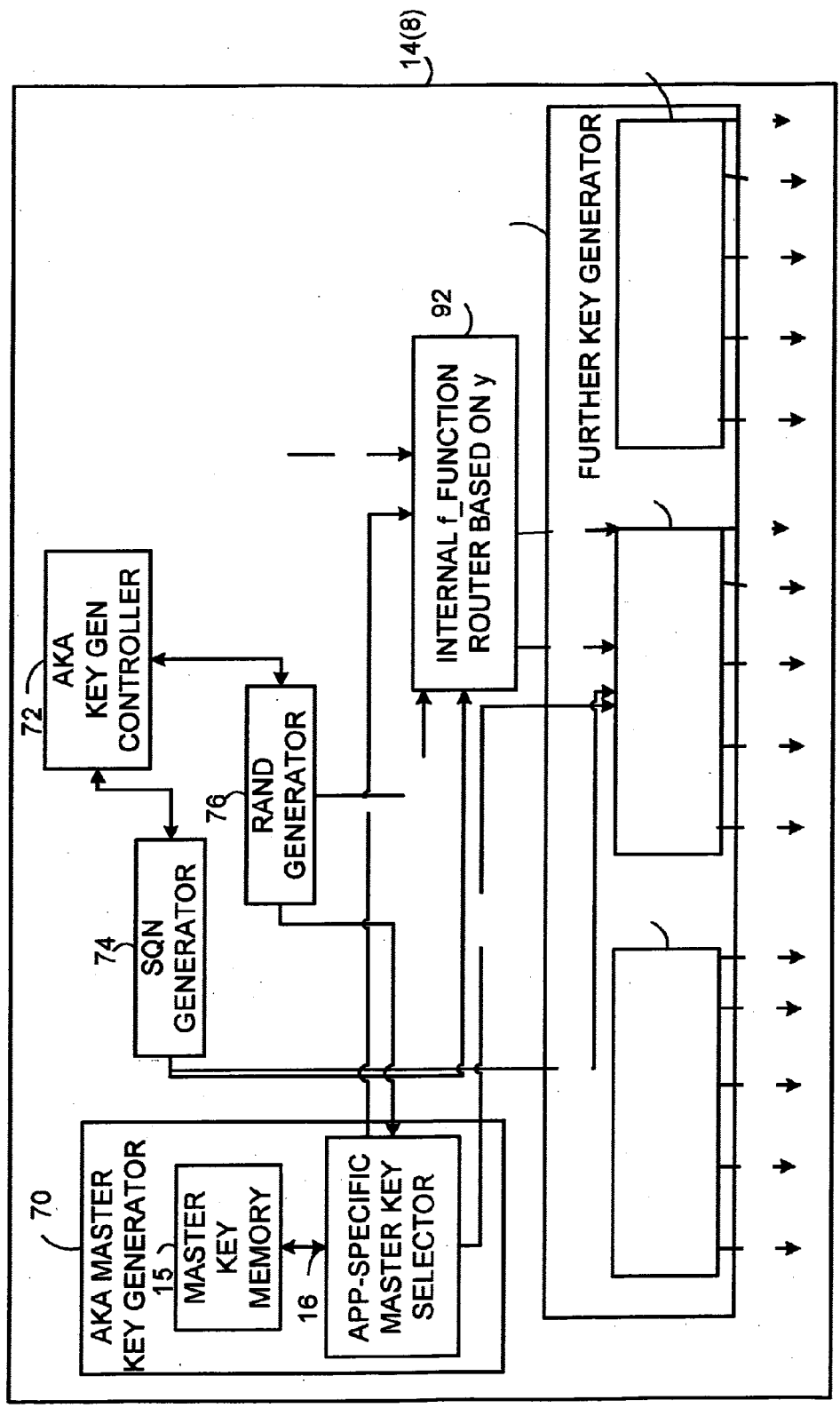
FIG. 8 is a diagrammatic view of an example embodiment of a AKA key generator comprising a further key generator and which comprises plural sets of f-functions.

The FIG. 8 embodiment of AKA key generator 14(8) includes AuC further key generator 17(8) which has a different set or collection of key functions (e.g., key functions f1-f5) for each possible master key value Ki_y selected by AuC application-specific master key selector 16. For example, if master key Ki_1 is selected by AuC application-specific master key selector 16, further function set $90_1$ is employed for deriving the further key functions such as the CK key and the IK key. FIG. 8 generically shows, for master key Ki_y, further function set $90_y$, being employed for deriving the further key functions. The further function set 90 which is employed is provided with necessary input information, e.g., the RAND and AMF parameters, through internal f_function router 92 which routes the necessary information to the employed further function set 90 based on the value of y.

Figure 9:
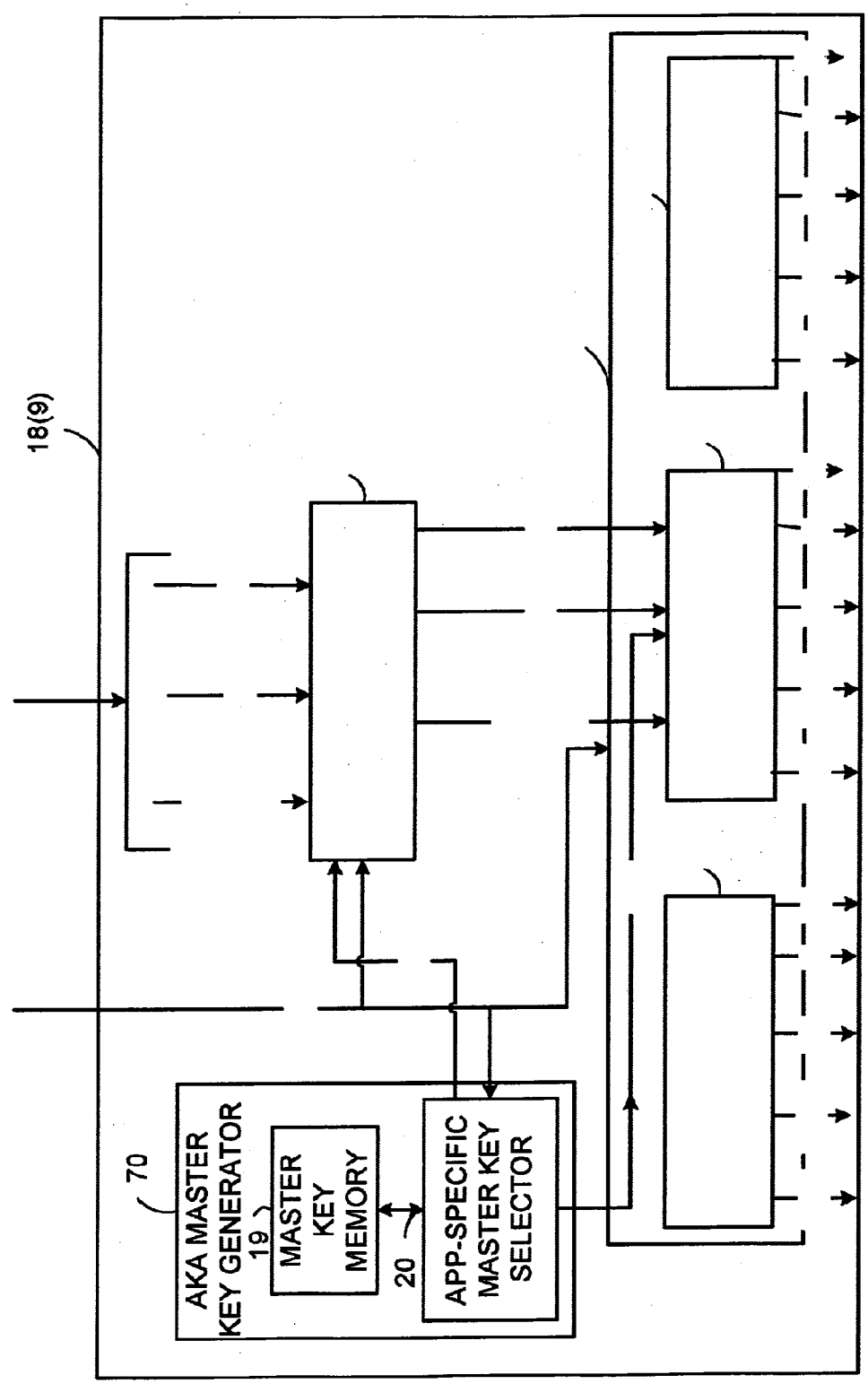
FIG. 9 is a diagrammatic view of an example embodiment of a AKA key manager for a user terminal and which comprises a further key generator which comprises plural sets of f-functions

In similar manner, the FIG. 9 embodiment of AKA key manager 18(8) includes terminal further key generator 21(9) which has a different set or collection of key functions (e.g., key functions f1-f5) for each possible master key value Ki_y selected by terminal application-specific master key selector 20.

For example, if master key Ki_1 is selected by terminal application-specific master key selector 20, further function set $94_1$ is employed for deriving the further key functions such as the CK key and the IK key. FIG. 9 generically shows, for master key Ki_y, further function set $94_y$, being employed for deriving the further key functions. The further function set 94 which is employed is provided with necessary input information, e.g., the MAC, SQN xor AK, and AMF parameters, through internal f_function router 96 which routes the necessary information to the employed further function set 94 based on the value of y.

In the prior art it is possible that, if one key (Ki) is "leaked" or compromised as a result of a weak f-algorithms, also other keys Kj obtained through the same set of f algorithms can also be compromised. The embodiments of key selectors having plural sets of f-functions advantageously overcome this prior art deficiency, since each possible master key Ki_j has its corresponding "f_functions" algorithm entity from which specific AKA keys are derived. In order to provide the generated SQN, RAND as well as the AMF to the correct "f_function" entity, the result of modulo function y=(RAND mod N) is provided as input to a function (e.g., internal f_function router 92 in FIG. 8 and internal f_function router 96 in FIG. 9) that simply distributes (or routes, furnishes, etc) the previous parameters to the correct f_function entity corresponding to Ki_y. Finally, Ki_y is also provided to the corresponding f-set of algorithms. As an alternative, the master key Ki_y could also be sent to the distribution function instead of "y" to use as criteria to select the correct f-set algorithms. As another example of the usefulness of this embodiments, different countries may have different restrictions on the use of cryptography. In such a case, other factors such as "location" of the user (e.g. "country") could be used as a factor when selecting the set of f-functions.

Figure 10:
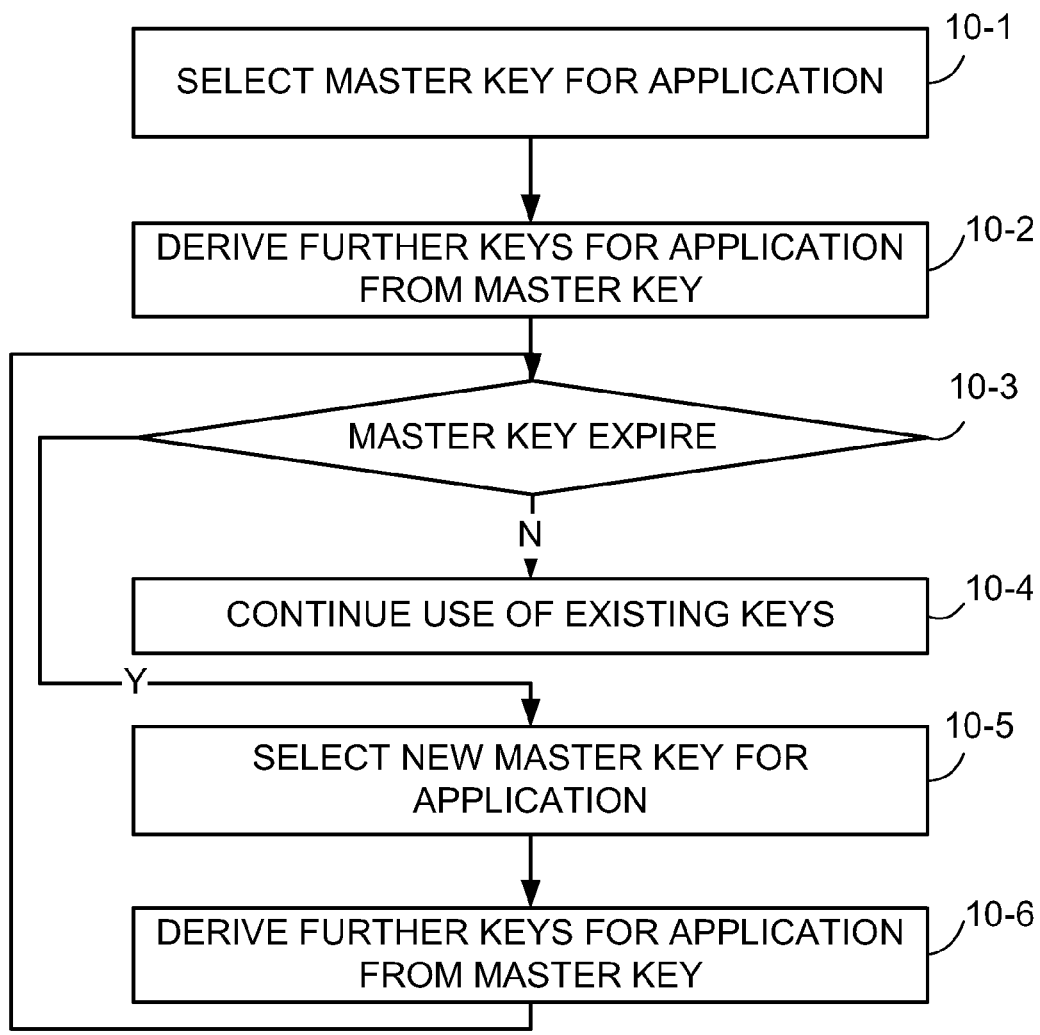
FIG. 10 is a flowchart showing example, basic acts or steps which can be performed in conjunction with a AKA key generation procedure having key renewal features.

In still another example embodiment having example acts or steps illustrated in FIG. 10, a new first master key for the first application upon expiration of a previous first master key. Act 10-1 represents the AKA key generation procedure generating a master key for a particular application, preferably an application-specific master key. Act 10-1 can be preformed in accordance with other embodiments herein described. Act 10-2 comprises derivation of the further keys, such as the CK key and the IK key, using f_functions (derivation of such further keys is also understood from other discussion of embodiments provided herein). Act10-3 involves a check of whether the existing master key has expired. The check of act 10-3 can be preformed, for example, by AKA key generation controller 72. If it is determined at act 10-3 that the existing master key has not expired, act 10-4 represents continuing use of the existing keys. However, if it is determined at act 10-3 that the existing master key has expired, a new master key is selected for the application as depicted by act 10-5. Thereafter, as act 10-6, further keys are derived based on the new master key. The new keys are utilized until such time as it may be determined by a repetition of act 10-4 that these keys have expired.

An example implementation of the key renewal embodiments represented by FIG. 10, the duration of the existing master key can be expressed as a sequence value (SQN) after which authentication vector(s) are no longer valid. Upon reaching the allotted expiration sequence value, a new authentication procedure is performed to select the new first master key for the on-going application.

Thus, in order to avoid using the same selected master key for a lengthy period of time, the key renewal embodiments represented by FIG. 10 introduce dynamically re-selecting a new master key to be used in the AKA procedure, and which is then used to derive the rest of the keys.

In an example implementation, a given sequence value SQN can be predefined after which authentication vectors are no longer valid. In other words, once an authentication vector with sequence value SQN is reached, then a full AKA authentication procedure is again carried out including new master key selection. To avoid re-selecting the current in use master key Ki_y, this key is kept as tagged, e.g., as not available at least for the new execution of AKA.

Thus, if there is a suspicion that certain Ki is leaked or compromised, the network authentication server (home network entity/authentication server (AuC) 11, in the form of e.g. HLR/AUC, HSS, AAA, etc) preferably should mark this key as "compromised" and not select it again. This can be inferred from a repetitive replay attack which would be an indication that a given master key Ki has been compromised.

Occasion may arise in which a new master key should be selected for an application involving a particular user terminal 13. One example embodiment of such an occasion has been discussed above with reference to FIG. 10 and certain key renewal features. A variation of such embodiment wherein selection of the new first master key is dependent, at least in part, on user state information. In other words, in addition to the AKA key generation procedure previously described which comprises allowing an end-user to have multiple master keys and randomly select one to be used as input to the AKA algorithm, security can be increased if user state information is used as input in re-runs of the AKA algorithm in addition to existing parameters. In example implementations, the user state information comprises at least one of: (1) a timestamp; (2) a network identifier; and (3) a user location. More specifically, examples of User State Information (USI) only known to the user equipment and to the network are:

Timestamp (assuming that both the user terminal and network have a coordinated network timing protocol) of the moment when authentication is requested.

Network ID that the user is registering via (or to) such as Home or Visited network ID, I-WLAN SSID, etc.

User location at the moment when authentication is triggered. This can be in the form of a GSM/UMTS location area or routing area, a WLAN/Wimax coverage area, base-station-ID etc.

Splitting the processing into two steps. The first step inputs RAND to compute (only) SQN and MAC. If these values are "OK", in a second step SQN is input together with RAND to generate keys. (This gives "extra" degree of replay protection: even if the MAC verification is wrong, a new SQN will be used to derive new keys.)

Including any combination of the previous information when GSM/UMTS AKA or EAP-AKA are run may be prone advantageously to increase the security of any derived key used in the network and thus also increase the safety of any master key (reducing the risk of having it compromised).

Figure 11:
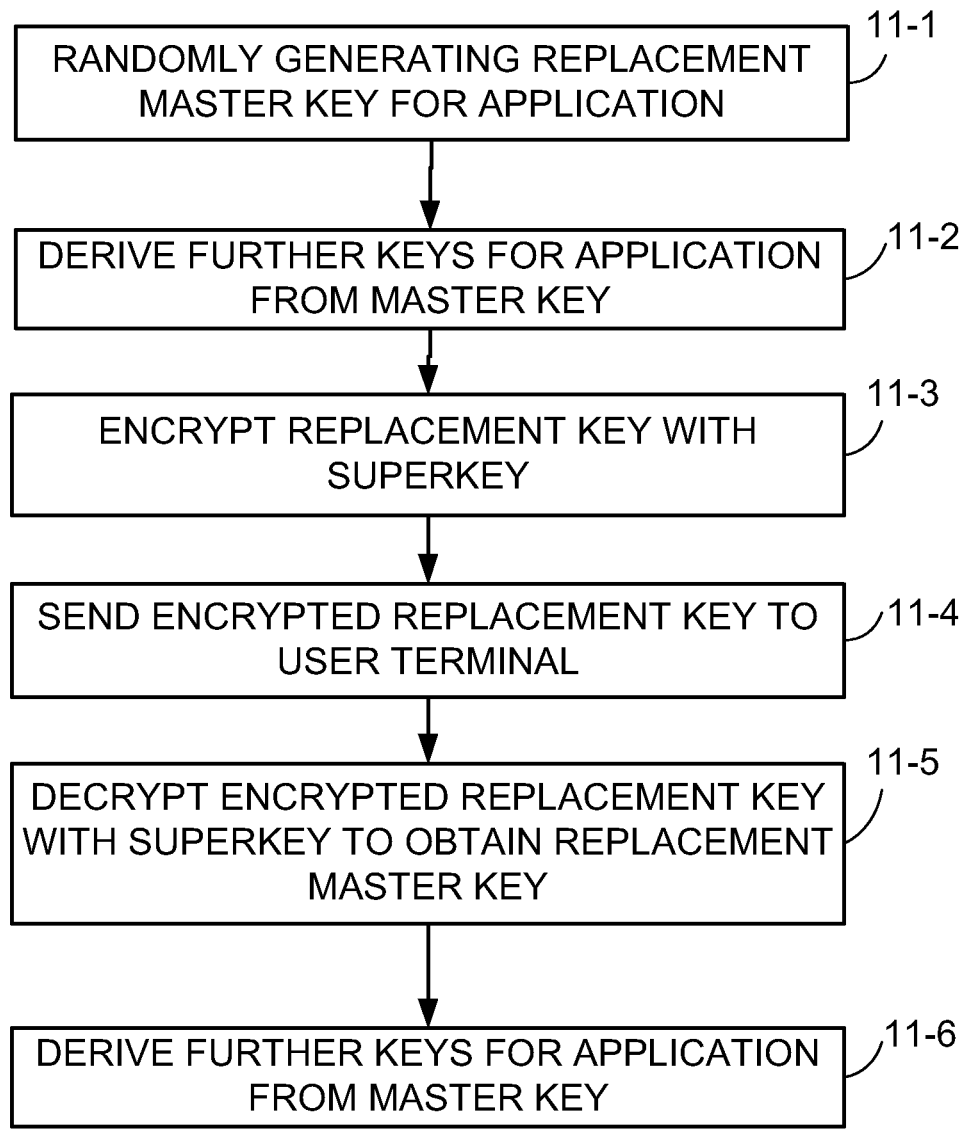
FIG. 11 is a flowchart showing example, basic acts or steps which can be performed in conjunction with a AKA key generation procedure having key replacement operation.

FIG. 11 illustrates selected, representative, non-limiting acts or steps involved with a further example embodiment. In the example embodiment of FIG. 11, both the AKA master key generator 70 and terminal master key generator 80 have stored thereat or otherwise predefined a superkey. The superkey can be stored in a memory, such as AuC master key memory 15 of home network entity/authentication server (AuC) 11 and terminal master key memory 19 of identity module 58. The acts of FIG. 11 are performed upon receiving an indication or prompt or otherwise discerning that a master key replacement operation need be performed, such as may occur when it is suspected that one of the master keys should not be used. Act 11-1 comprises randomly generating a replacement master key at AKA key generator 14. As understood from other embodiments, act 11-2 comprises deriving the CK key and the IK key from the replacement master key. Act 11-3 comprises encrypting the replacement master key with the superkey. As indicated above, the superkey is known (preferably pre-known) to the user terminal and the home network entity 11. Act 11-2 comprises sending the encrypted replacement master key from the home network entity 11 to the user terminal 13. Act 11-5, performed at identity module 58 of user terminal 13, comprises decrypting the received encrypted replacement key with the superkey to obtain the replacement master key, and thereby replacing the suspect one of the master keys with the replacement master key. Act 11-6 comprises deriving the CK key and the IK key from the replacement master key as now know to identity module 58 of user terminal 13.

In addition to the acts illustrated in FIG. 11, the replacement key operation can and preferably further includes additional acts. Such acts can include, for example, marking or flagging any suspect or problem key as "compromised"; the identity module 58 verifying the replacement key as received from home network entity/authentication server (AuC) 11 as being authentic and "re-programming" the Ki value with the new Ki'; the identity module 58 sending an authenticated acknowledgement to home network entity/ authentication server (AuC) 11; and (thereafter) the home network entity/authentication server (AuC) 11 "unmarking" the key Ki so that it is no longer considered as compromised. In this way, after execution of the key replacement operation, key Ki can be used again.

Whereas in most cases selection of the first master key is random, selection of the next key for another application is not strictly random in the sense that the first key may be tagged as used and thus the second key selection, while being perhaps random among the remaining set (e.g., pseudo-random), is not random over the entire set of keys. In an extreme situation, only one key may remain as a candidate for the next application. In other situations, selection may be made partly in dependence upon other information such as user state, e.g., location, which is not a random factor.

It will be appreciated that numerous embellishments and additional features can be included with one or more of the example embodiments described herein. For example, it is entirely possible for one or more embodiments described herein for the Ki keys to have different lengths. Further, as an example the keys can be asymmetric PKI keys, if desired. Moreover, as mentioned, separate, designated keys are used for signatures and authentication to mitigate threats. The above mechanisms provide ways to achieve the same thing without ear-marking keys from the beginning, at least if the signatures are sufficient to have a short life-time. The approach above of selecting keys "modulo N" (the number of keys) is of course also possible.

Thus, in at least some example embodiments and modes, the technology encompasses one or more of the following:

Providing end-users and the network with a range of master keys (Ki) to ensure that different applications that require AKA as authentication procedure do not use the same Ki to derive further keys. In other words, instead of having just one Ki, a user will have assigned [Ki_1, Ki_2 . . . , Ki_n].

Providing a mechanism to randomly select a Ki master key from the range of master keys [Ki_1, Ki_2 . . . , Ki_n] assigned to a user, both on the user terminal and in the network, from which to derive further keys when executing AKA.

Providing a mechanism to tag a selected master key as "in-use" and thus not available for other AKA procedures or applications that make use of AKA. A different Ki_j, must be selected from those available in the assigned range.

Allowing the network and the user terminal to dynamically select a new master key from the available keys in [Ki_1, Ki_2 . . . , Ki_n] from which to derive new keys based on some common algorithm and criteria.

Allowing other authentication mechanisms based on keys such as PKI to also make use of the procedure described earlier.

Allowing other extensions by "tying" key usage to specific context.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. Reference herein to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed hereby. Moreover, it is not necessary for a device or method to address each and every problem sought to be solved by the present invention, for it to be encompassed hereby. Furthermore, no element, component, or method step in the present disclosure is intended to be dedicated to the public.

What is claimed is:

1. An authentication method, comprising:
   pre-generating a set of N plural number of master keys by an authentication key agreement (AKA) master key generator;
   providing the pre-generated set of N plural number of master keys both to a user terminal and to a home network entity for the user terminal, wherein each of the user terminal and the home network entity includes a master key memory for storing the pre-generated set of N plural number of master keys;
   for each time when an authentication key agreement (AKA) transaction is performed for a first application, randomly selecting, by using a random number known to both the user terminal and the home network entity for the user terminal, one master key from the pre-generated set of N plural number of master keys to serve as a first master key for use both at the user terminal and the home network entity for deriving further keys for the first application; and
   for each time when an authentication key agreement (AKA) transaction is performed for a second application, selecting another master key from the pre-generated set of N plural number of master keys to serve as a second master key for use both at the user terminal and the home network entity for deriving further keys for the second application.

2. The method of claim 1, wherein randomly selecting one master key from the N number of master keys to serve as a first master key comprises selecting key y of the set, where y=(RAND mod N), where RAND is the random number known to both the user terminal and the home network entity for the user terminal.

3. The method of claim 1, wherein randomly selecting the second master key from the N number of master keys comprises assuring that the second key is different from the key selected as the first master key.

4. The method of claim 3, wherein randomly selecting a second master key from the N number of master keys to serve as master key for the second application comprises using a next of the master keys in a cyclical order.

5. The method of claim 3, further comprising randomly selecting the second master key from the N number of master keys to serve as the master key for the second application by selecting key y' of the set, where y'=(RAND' mod N), where RAND' is the random number known to both the user terminal and the home network entity for the user terminal, and wherein RAND' is not used to obtain the first master key.

6. The method of claim 3, further comprising selecting the second master key from the N number of the master keys to serve as the master key for the second application by selecting key y' of a revised set, the revised set comprising N−1 number of master keys, the revised set of master keys not including the first master key selected for the first application.

7. The method of claim 6, wherein where y'=(RAND' mod N−1), where RAND' is the random number known to both the user terminal and the home network entity for the user terminal.

8. The method of claim 6, wherein RAND' is not used to obtain the first master key.

9. The method of claim 1, wherein the user terminal is a wireless user terminal, and wherein the method further comprises:
   providing selected authentication vector values to the wireless user terminal through a radio access network;
   the wireless user terminal using the selected authentication vector values to obtain the first master key and further keys for use by the first application.

10. The method of claim 1, wherein randomly selecting one of the N number of master keys to serve as a first master key comprises plural factors, the plural factors comprising (1) the random number known to both the user terminal and the home network entity for the user terminal; and (2) a second factor.

11. The method of claim 10, wherein the second factor is one of: (1) user terminal type or identity; (2) access network type; (3) user terminal location; (4) context information for the first application.

12. The method of claim 1, further comprising:
    using a first set of algorithms to derive the further keys for the first application; and
    using a second set of algorithms distinct from said first set to derive the further keys for the second application.

13. The method of claim 1, further comprising selecting a new first master key for the first application upon expiration of the first master key.

14. The method of claim 13, further comprising:
    selecting the new first master key upon expiration of a duration for the first master key;
    expressing the duration as a sequence value after which authentication vector(s) are no longer valid;
    upon reaching the sequence value, performing a new authentication procedure to select the new first master key for the first application.

15. The method of claim 13, further comprising selecting the new first master key at least in part on the basis of user state information.

16. The method of claim 15, wherein the user state information comprises at least one of: (1) a timestamp; (2) a network identifier; and (3) a user location.

17. The method of claim 1, wherein when a suspect one of the master keys should not be used:
    randomly generating a replacement master key;
    encrypting the replacement master key with a superkey known to the user terminal and the home network entity;
    sending the encrypted replacement master key from the home network entity to the user terminal; and
    at the user terminal, replacing the suspect one of the master keys with the replacement master key.

18. The method of claim 1, wherein, when the authentication key agreement (AKA) transaction is performed for the second application, the second master key is randomly selected from the N number of master keys.

19. An authentication entity, comprising:
    a master key generator configured to pre-generate a set of N plural number of master keys;
    a further key generator;
    the authentication entity being characterized by:
      a master key memory configured to store the pre-configured set of N plural number of master keys for a wireless user terminal;
      an application-specific master key selector configured to:

for each time when an authentication key agreement (AKA) transaction for a first application is performed by the user terminal, randomly select, by using a random number known to both the user terminal and a home network entity for the user terminal, one master key from the pre-configured set of N number of master keys to serve as a first master key for use both by the user terminal and the home network entity for deriving further keys for the first application; and for each time when an authentication key agreement (AKA) transaction for another application is performed by the user terminal, select another master key from the pre-configured set of N number of master keys to serve as a second master key for use both by the user terminal and the home network entity for deriving further keys for the another application; and wherein the further key generator is configured to use a master key selected by the application-specific master key selector to derive the further keys.

20. The apparatus of claim 19, wherein the entity is configured to communicate through a radio access network to a wireless user terminal.

21. The apparatus of claim 19, wherein the entity is an authentication server situated in a home environment of a telecommunications system.

22. The apparatus of claim 19, wherein the entity is a user terminal comprising a transceiver configured to receive values of an authentication vector from an authentication server of a telecommunications system.

23. The apparatus of claim 19, wherein the master key selector is configured to randomly select one of the N number of master keys to serve as a first master key by selecting key y of the set, where y=(RAND mod N), where RAND is the random number known to both the user terminal and the home network entity for the user terminal.

24. The apparatus of claim 19, wherein the master key selector is configured to select randomly a second master key from the N number of master keys to serve as master key for the another application by using a next of the master keys in a cyclical order.

25. The apparatus of claim 19, wherein the master key selector is configured to select randomly a second master key from the N number of master keys to serve as master key for the another application by selecting key y' of the set, where y'=(RAND' mod N), where RAND' is the random number known to both the user terminal and the home network entity for the user terminal, and wherein RAND' is not used to obtain the first master key.

26. The apparatus of claim 19, wherein the master key selector is configured to select the second master key from the N number of master keys to serve as master key for the another application by selecting key y' of a revised set, the revised set comprising N−1 number of master keys, the revised set of master keys not including the first master key selected for the first application, and wherein where y'= (RAND' mod N−1), where RAND' is the random number known to both the user terminal and the home network entity for the user terminal.

27. The apparatus of claim 19, wherein the master key selector is configured to randomly select one of the N number of master keys to serve as a first master key using plural factors, the plural factors comprising (1) the random number known to both the user terminal and the home network entity for the user terminal; and (2) a second factor.

28. The apparatus of claim 27, wherein the second factor is one of:
(1) user terminal type or identity; (2) access network type; (3) user terminal location; (4) context information for the first application.

29. The apparatus of claim 19, wherein the further key generator is configured to use a first set of algorithms to derive the further keys for the first application and a distinct second set of algorithms to derive the further keys for the second application.

30. The apparatus of claim 19, wherein the master key selector is configured to select a new first master key for the first application upon expiration of the first master key.

31. The apparatus of claim 30, wherein the master key selector is configured to select the new first master key upon expiration of a duration for the first master key and to express the duration as a sequence value after which authentication vector(s) are no longer valid, and whereupon the sequence value is attained, the authentication server is configured to select the new first master key for the first application.

32. The apparatus of claim 30, wherein the master key selector is configured to select the new first master key at least in part on basis of user state information.

33. The apparatus of claim 32, wherein the user state information comprises at least one of: (1) a timestamp; (2) a network identifier; and (3) a user location.

34. The apparatus of claim 19, wherein the entity is an authentication server, and when a suspect one of the master keys should not be used, the master key selector is configured to randomly generate a replacement master key and to encrypt the replacement master key with a superkey known to the user terminal and the home network entity.

35. The apparatus of claim 19, wherein the entity is a user terminal comprising a transceiver configured to receive an authentication vector from an authentication server, and when a suspect one of the master keys should not be used, the master key selector is configured to decrypt a replacement master key with a superkey known to the user terminal and to replace the suspect one of the master keys with the replacement master key.

36. The apparatus of claim 19, wherein, when the authentication key agreement (AKA) transaction for the other application is performed by the user terminal, the second master key is randomly selected from the N number of master keys.

* * * * *